United States Patent
Ries et al.

(10) Patent No.: US 12,555,160 B2
(45) Date of Patent: *Feb. 17, 2026

(54) EXTERNALLY HELD ACCOUNT DISCOVERY AND AGGREGATION

(71) Applicant: MX Technologies, Inc., Lehi, UT (US)

(72) Inventors: Daniel Ries, Provo, UT (US); John Ryan Caldwell, Lehi, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,884

(22) Filed: Nov. 24, 2023

(65) Prior Publication Data

US 2024/0095820 A1 Mar. 21, 2024

Related U.S. Application Data

(63) Continuation of application No. 15/885,745, filed on Jan. 31, 2018, now Pat. No. 11,869,069.

(60) Provisional application No. 62/452,872, filed on Jan. 31, 2017.

(51) Int. Cl.
*G06Q 40/02* (2023.01)
*H04L 9/40* (2022.01)

(52) U.S. Cl.
CPC ......... *G06Q 40/02* (2013.01); *H04L 63/0853* (2013.01); *H04L 63/0884* (2013.01)

(58) Field of Classification Search
CPC .. G06Q 40/02; H04L 63/0853; H04L 63/0884
See application file for complete search history.

(56) References Cited

U.S. PATENT DOCUMENTS

| | | | | |
|---|---|---|---|---|
| 7,693,771 B1* | 4/2010 | Zimmerman | .......... | G06Q 40/06 705/37 |
| 8,924,288 B1* | 12/2014 | Easley | .................. | G06Q 30/04 705/40 |
| 9,053,318 B2* | 6/2015 | Hayat | ..................... | G06F 21/10 |
| 9,953,318 B1* | 4/2018 | Firstenberger | ......... | G06Q 20/40 |
| 10,032,146 B2* | 7/2018 | Caldwell | ................ | G06Q 20/14 |
| 2006/0116949 A1* | 6/2006 | Wehunt | .................. | G06Q 40/02 705/35 |
| 2008/0275816 A1* | 11/2008 | Hazlehurst | ............. | G06Q 30/04 705/40 |
| 2014/0236792 A1* | 8/2014 | Pant | ....................... | G06Q 40/02 705/35 |
| 2017/0161698 A1* | 6/2017 | Caldwell | .............. | G06Q 20/102 |

* cited by examiner

Primary Examiner — Scott S Trotter
(74) Attorney, Agent, or Firm — KNH LLP

(57) ABSTRACT

Apparatuses, systems, methods, and computer program products are disclosed for externally held account discovery and aggregation. A method includes aggregating transactions of a first service provider from one or more servers to a trusted hardware device. A method includes identifying, on a trusted hardware device, one or more transactions of a first service provider between an account of a user with the first service provider and an account of the user with a second service provider. A method includes prompting a user for electronic credentials for an account of the user with a second service provider. A method includes accessing data of a user from a second service provider on behalf of the user using electronic credentials.

20 Claims, 7 Drawing Sheets

EXTERNALLY HELD ACCOUNT DISCOVERY AND AGGREGATION

CROSS-REFERENCES TO RELATED APPLICATIONS

This application is a continuation of U.S. patent application Ser. No. 15/885,745 entitled "EXTERNALLY HELD ACCOUNT DISCOVERY AND AGGREGATION" and filed on Jan. 31, 2018 for Daniel Ries, et al., which claims the benefit of U.S. Provisional Patent Application No. 62/452,872 entitled "EXTERNALLY HELD ACCOUNT DISCOVERY" and filed on Jan. 31, 2017 for Daniel Ries, et al., which is incorporated herein by reference in its entirety for all purposes.

FIELD

This invention relates to aggregating transaction data and more particularly relates to discovering and aggregating externally held accounts from a different entity.

BACKGROUND

As more and more of a user's data moves to the cloud, and more and more events and/or transactions become electronic, it has become increasingly difficult for a user to manage and/or update each of the user's accounts. Even if a user aggregates or manages multiple electronic accounts in a central location, the user may forget to add certain accounts, may have technical issues adding certain accounts, or the like.

SUMMARY

Methods are presented for externally held account discovery and aggregation. In one embodiment, method includes aggregating transactions of a first service provider from one or more servers to a trusted hardware device. A method, in certain embodiments, includes identifying, on a trusted hardware device, one or more transactions of a first service provider between an account of a user with the first service provider and an account of the user with a second service provider. A method, in a further embodiment, includes prompting a user for electronic credentials for an account of the user with a second service provider. In some embodiments, a method includes accessing data of a user from a second service provider on behalf of the user using electronic credentials.

Apparatuses are presented for externally held account discovery and aggregation. An apparatus, in one embodiment, includes a trusted hardware device authorized by a user to use a plurality of electronic credentials for the user. A trusted hardware device, in certain embodiments, is configured to aggregate transactions of a first service provider from one or more servers using one or more electronic credentials for a user. In one embodiment, a trusted hardware device is configured to identify one or more aggregated transactions associated with both a first service provider and with a second service provider for which the trusted hardware device has not yet received electronic credentials for a user. A trusted hardware device, in some embodiments, is configured to prompt a user for electronic credentials for the user for a second service provider. In certain embodiments, a trusted hardware device is configured to aggregate transactions of a second service provider, using electronic credentials for a user for the second service provider.

Systems are presented for externally held account discovery and aggregation. A backend server, in one embodiment, identifies one or more externally held accounts for at least a subset of a plurality of users based on aggregated transaction data for each of the plurality of users from a service provider associated with the backend server, and the one or more externally held accounts are held for the subset of users by a third party service provider. In certain embodiments, a plurality of external account modules located on hardware devices for a plurality of users are configured to prompt at least a subset of users for electronic credentials for a third party service provider and to aggregate transaction data for one or more of the users from the third party service provider using the electronic credentials.

An apparatus, in another embodiment, includes means for performing the various steps and operations described with regard to the disclosed methods, apparatuses, and systems. Computer program products comprising a computer readable storage medium are presented. In certain embodiments, a computer readable storage medium stores computer usable program code executable to perform one or more of the operations described with regard to the disclosed methods, apparatuses, and systems.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
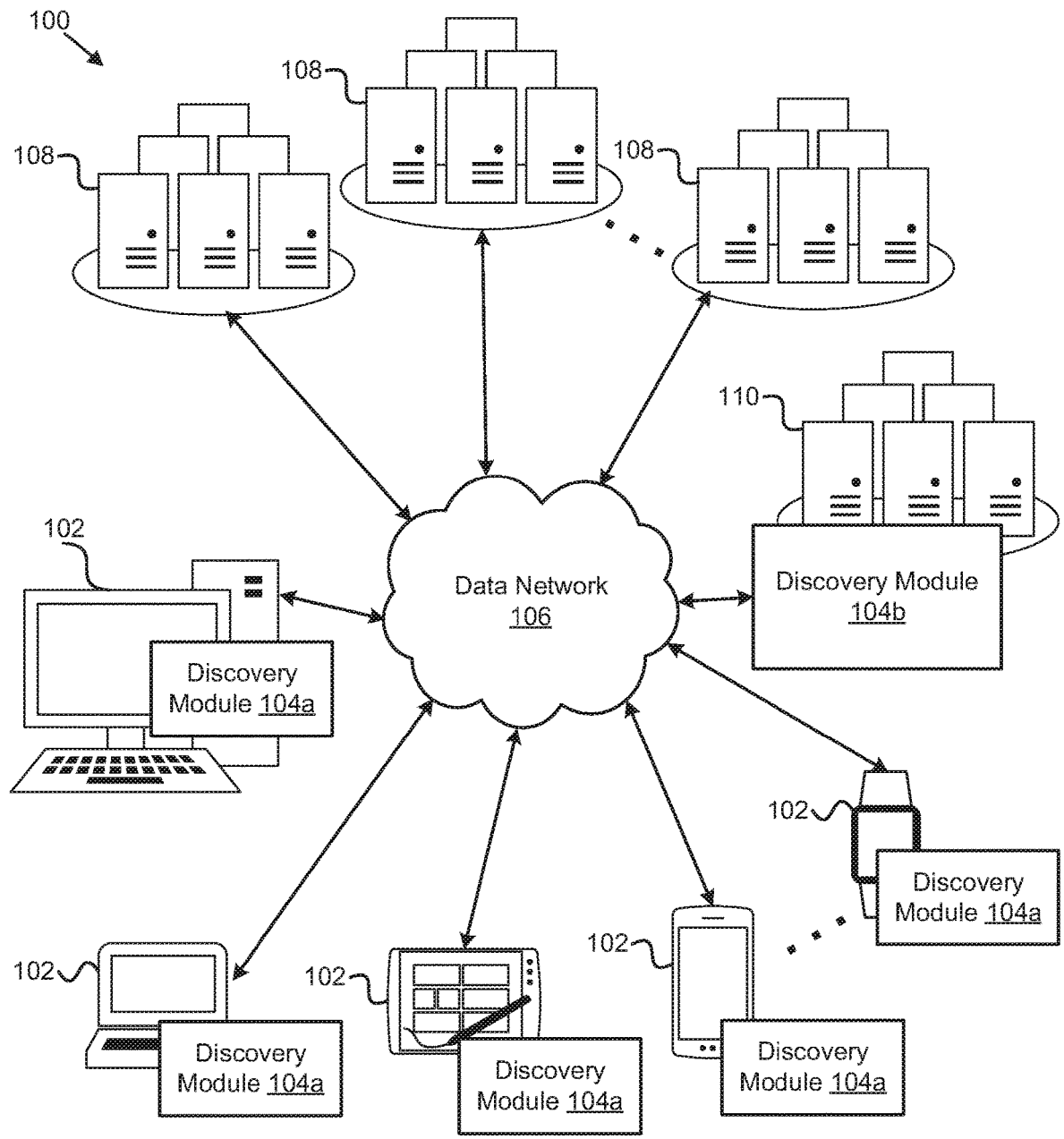
FIG. 1 is a schematic block diagram illustrating one embodiment of a system for externally held account discovery and aggregation.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (e.g., including firmware, resident software, micro-code, etc. stored on a non-transitory computer readable storage medium) or an embodiment combining software and hardware aspects that may all generally be referred to herein as a "circuit," "module," or "system." Furthermore, aspects of the present invention may take the form of a computer program product embodied in one or more non-transitory computer readable storage medium(s) having program code embodied thereon.

Many of the functional units described in this specification have been labeled as modules, in order to more particularly emphasize their implementation independence. For example, a module may be implemented as a logic hardware circuit comprising custom VLSI circuits or gate arrays (e.g., an application specific integrated circuit), off-the-shelf semiconductors such as logic chips, transistors, and/or other discrete components. A module may also be implemented in one or more programmable hardware devices such as field programmable gate arrays, programmable array logic, programmable logic devices, or the like.

Modules may also be implemented at least partially in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more non-transitory computer readable storage media. A computer program product may include a non-transitory computer readable storage medium (or media) storing computer readable program instructions thereon for causing a processor to carry out aspects of the present invention.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM"), a semiconductor memory device (e.g., NAND Flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), or the like), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, script instructions, machine dependent instructions, microcode, firmware instructions, state-setting data, or either source code or object code written in any combination of one or more programming languages, including an object oriented programming language such as Smalltalk, C++, Java, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for externally held account discovery. In one embodiment, the system 100 includes one or more hardware devices 102, one or more discovery modules 104 (e.g., a backend discovery module 104b and/or a plurality of discovery modules 104a disposed on the one or more hardware devices 102), one or more data networks 106 or other communication channels, one or more third party service providers 108 (e.g., one or more servers 108 of one or more service providers 108; one or more cloud or network service providers, or the like), and/or one or more backend servers 110. In certain embodiments, even though a specific number of hardware devices 102, discovery modules 104, data networks 106, third party service providers 108, and/or backend servers 110 are depicted in FIG. 1, one of skill in the art will recognize, in light of this disclosure, that any number of hardware devices 102, discovery modules 104, data networks 106, service providers 108, and/or backend servers 110 may be included in the system 100 for externally held account discovery and aggregation.

In one embodiment, the system 100 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more service providers 108 (e.g., third party servers 108 and/or third party service providers 108) and/or one or more backend servers 110 (e.g., first party servers 110 of a first party service provider 108, of a discovery module 104b, or the like) via a data network 106, described below. The one or more hardware devices 102, in a further embodiment, are capable of executing various programs, program code, applications, instructions, functions, or the like.

In one embodiment, a discovery module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more service providers 108. The discovery module 104, in certain embodiments, accesses a server 108 of a service provider 108 using a user's electronic credentials to download data associated with the user from the server 108, such as a user's photos, a user's social media posts, a user's medical records, a user's financial transaction records or other financial data, and/or other data associated with and/or owned by a user but stored by a server 108 of a third party service provider 108 (e.g., stored by hardware not owned, maintained, and/or controlled by the user). The discovery module 104, in various embodiments, may provide the downloaded data to the user locally (e.g., displaying the data on an electronic display of a hardware device 102); may provide the downloaded data from the hardware device 102 of the user to and/or package the data for a remote server 110 (e.g., a backend discovery module 104*b*) or other remote device (e.g., another hardware device 102 of the user, a hardware device 102 of a different user, or the like) which may be unaffiliated with the third party service provider 108; may provide one or more prompts, alerts, messages, advertisements, or other communications to the user (e.g., on a hardware device 102) based on the downloaded data; or the like.

In one embodiment, a discovery module 104 may aggregate financial transactions from accounts of one or more financial institution service providers 108 (e.g., checking accounts, savings account, other deposit accounts) to discover one or more externally held accounts (e.g., loans, checking accounts, savings accounts, other financial accounts) at a different financial institution service provider 108, which the user has not yet aggregated using the discovery module 104. For example, a discovery module 104 may identify, in aggregated transactions, one or more payments from a checking and/or savings account at a first financial institution 108, to pay a loan (e.g., a vehicle loan, a mortgage, a student loan, a personal loan, a business loan, or the like) at a second financial institution 108, electronic credentials for which the user has not yet provided to the discovery module 104. In response to discovering an externally held account of a user that has not yet been aggregated, a discovery module 104 may prompt the user for electronic credentials for aggregating the discovered externally held account, may prompt the user to transfer and/or replace the discovered externally held account with an account from the service provider 108 associated with the discovery module 104, or the like.

The discovery module 104, in certain embodiments, may parse aggregated data to identify externally held accounts that users have not yet aggregated. In one embodiment, by categorizing and classifying a user's financial transactions, the discovery module 104 may identify transactions that are associated with payments made to an external account, which the user has not yet setup for aggregation. For example, if a user makes a checking or savings account payment from one service provider 108 (e.g., a bank or credit union) to an external credit card account at another service provider 108 (e.g., from which the discovery module 104 is not yet downloading or aggregating data), the discovery module 104 may perform a check against that user's aggregated accounts. If the user does not have an aggregated account which matches the payment, then the discovery module 104 may create a Discovered Accounts record.

In various embodiments, the discovery module 104 may discover one or more of credit cards, mortgages, auto loans, investment accounts (e.g., brokerage accounts, plan 529 accounts, IRA accounts, 401k accounts, flexible spending accounts, health savings accounts, or the like), savings accounts, checking accounts, and/or other account types. In other embodiments, the discovery module 104 may discover social media accounts, photo sharing accounts, data hosting accounts, streaming music and/or video accounts, or the like, as posts, photos, data, songs, shows, movies, video clips, or the like are transferred and/or shared between different service providers 108.

The discovery module 104, in certain embodiments, provides a graphical user interface (GUI) and/or another user interface to a user, to display the discovered accounts and/or related metrics to the user. For example, the discovery module 104 may display discovered accounts by organization 108, discovered accounts by account type, discovered credit cards by organization, users with discovered accounts by organization, users with discovered accounts by account type, or the like. Additionally, the discovery module 104 may segment users with discovered accounts using one or more filters, such as account type, organization 108, or the like. The discovery module 104, in one embodiment, may determine how much money is leaving one organization 108 to one or more other organizations 108, what account types users of one organization 108 have with one or more other organizations 108, or the like.

In certain embodiments, the system 100 includes a plurality of discovery modules 104 disposed/located on hardware devices 102 of a plurality of different users (e.g., comprising hardware of and/or executable code running on one or more hardware devices 102). The plurality of discovery modules 104 may act as a distributed and/or decentralized system 100, executing across multiple hardware devices 102, which are geographically dispersed and using different IP addresses, each downloading and/or aggregating data (e.g., photos, social media posts, medical records, financial transaction records, other financial data, and/or other user data) separately, in a distributed and/or decentralized manner. While a service provider 108 (e.g., a financial institution, bank, credit union, and/or other online banking provider; a social media site; a medical provider; a photo hosting site; or the like) may block a data aggregation service or other entity from accessing data for a plurality of users from a single location (e.g., a single IP address, a single block of IP addresses, or the like), a distributed and/or decentralized swarm of many discovery modules 104, in certain embodiments, may be much more difficult for a service provider 108 to block.

In one embodiment, a hardware device 102 may include and/or execute an internet browser, which a user may use to access a server 108 of a service provider 108 (e.g., by loading a webpage of the service provider 108 in the internet browser). At least a portion of a discovery module 104, in certain embodiments, may comprise a plugin to and/or an extension of an internet browser of a user's personal hardware device 102, so that a service provider 108 may not block the discovery module 104 from accessing the server 108 of the service provider 108 without also blocking the user's own access to the server 108 using the internet browser. For example, the discovery module 104 may use the same cookies, IP address, saved credentials, or the like as a user would when accessing a server 108 of a service provider 108 through the internet browser. In certain embodiments, the discovery module 104 may support integration with multiple different types of internet browsers (e.g., on different hardware devices 102).

A discovery module 104, in certain embodiments, may mimic or copy a user's behavioral pattern in accessing a server 108 of a service provider 108, to reduce a likelihood that the service provider 108 may distinguish access to the server 108 by a discovery module 104 from access to the server 108 by a user. For example, a discovery module 104 may visit one or more locations (e.g., webpages) of a server 108 of a service provider 108, even if the discovery module 104 does not intend to download data from each of the one or more locations, may wait for a certain delay time between accessing different locations, may use a certain scroll pattern, or the like, to mask the discovery module 104's downloading and/or aggregating of a user's data, to reduce the chances of being detected and/or blocked by the service provider 108.

In one embodiment, at least a portion of a discovery module 104 may be integrated with or otherwise part of another application executing on a hardware device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use data the discovery module 104 downloads from a server 108 of a service provider 108.

In one embodiment, the discovery modules 104a comprise a distributed system 100, with the discovery modules 104a and/or the associated hardware devices 102 downloading and/or aggregating data substantially independently (e.g., downloading data concurrently or non-concurrently, without a global clock, with independent success and/or failure of components). Distributed discovery modules 104a may pass messages to each other and/or to a backend discovery module 104b, to coordinate their distributed aggregation of data for users, to migrate identified accounts to different service providers 108, or the like. In one embodiment, the discovery modules 104a are decentralized (e.g., hardware devices 102 associated with users perform one or more aggregation functions such as downloading data), rather than relying exclusively on a centralized server or other device to perform one or more aggregation functions. In another embodiment, a centralized backend server 110 (e.g., a backend discovery module 104b) downloads data and/or performs one or more aggregation functions for a plurality of users and/or user hardware devices 102 (e.g., comprising and/or executing frontend event migration modules 104a) using a centralized, non-distributed approach (e.g., with a plurality of frontend discovery modules 104a providing an interface on the hardware devices 102 of the users to access functions provided by the backend discovery module 104b, or the like).

In a distributed and/or decentralized system 100, a central entity, such as a backend discovery module 104b and/or a backend server 110, in certain embodiments, may still provide, to one or more discovery modules 104a, one or more messages comprising instructions for accessing a server 108 of a service provider 108 using a user's electronic credentials, instructions for migrating and/or switching one or more accounts to a different service provider 108, or the like. For example, a backend discovery module 104b may provide one or more discovery modules 104a of one or more hardware devices 102 with one or more sets of instructions for accessing a server 108 of a service provider 108, such as a location for entering a user's electronic credentials (e.g., a text box, a field, a label, a coordinate, or the like), an instruction for submitting a user's electronic credentials (e.g., a button to press, a link to click, or the like), one or more locations of data associated with a user (e.g., a row in a table or chart, a column in a table or chart, a uniform resource locator (URL) or other address, a coordinate, a label, or the like), a location for entering information associated with a different service provider 108 (e.g., a text box, a field, a label, a coordinate, or the like for entering a different debit or credit card number issued by and/or an account number provided by the different service provider 108, for entering a URL or other address of the different service provider 108, for entering instructions to use the different service provider 108, or the like depending on a type of data or account and/or a type of the different service provider 108), an instruction for submitting information associated with the different service provider 108 (e.g., a button to press, a link to click, or the like), and/or other instructions or information, using which the discovery modules 104a may access and download a user's data, begin aggregating data from a new account, migrate an account, and/or other instructions or information, using which the discovery modules 104a may access and download a user's data, aggregate data from a new account, or the like.

In a further embodiment, one or more discovery modules 104a may pass messages to each other, such as instructions for accessing a server 108 of a service provider 108 (e.g., to aggregate data for a new account, to migrate and/or transfer an account, or the like) using a user's credentials, or the like, in a peer-to-peer manner. In another embodiment, a central entity, such as a backend discovery module 104b, may initially seed one or more sets of instructions for accessing a server 108 of a service provider 108 using a user's credentials to one or more discovery modules 104a, and the one or more discovery modules 104a may send the one or more sets of instructions to other discovery modules 104a.

Instructions for accessing a user's data and/or for migrating a user's account to a different service provider 108, however, in certain embodiments, may change over time, may vary for different users of a service provider 108, or the like (e.g., due to upgrades, different service levels or servers 108 for different users, acquisitions and/or consolidation of different service providers 108, or the like), causing certain instructions to fail over time and/or for certain users, preventing a discovery module 104 from accessing and downloading a user's data. A backend discovery module 104b, in one embodiment, may provide one or more discovery modules 104a with a hierarchical list of multiple sets of instructions, known to have enabled access to a user's data from a server 108 of a service provider 108 and/or migration of a user's account to a different service provider 108. A discovery module 104a on a hardware device 102 may try different sets of instructions in hierarchical order, until the discovery module 104a is able to access a user's data, aggregate a new account, migrate a user's account to a different service provider 108, or the like.

A discovery module 104, in certain embodiments, may provide an interface to a user allowing the user to repair or fix failed instructions for accessing the user's data and/or migrating a user's account, by graphically identify an input location for the user's electronic credentials, an instruction for submitting a user's electronic credentials, a location of data associated with the user, an input location for information of a different service provider 108, an instruction for submitting the information of the different service provider 108, or the like. A discovery module 104, in one embodiment, may highlight or otherwise suggest (e.g., bold, color, depict a visual comment or label, or the like) an estimate which the discovery module 104 has determined of an input location for the user's electronic credentials, an instruction for submitting a user's electronic credentials, a location of data associated with the user, an input location for information of a different service provider 108, an instruction for submitting the information of the different service provider 108, or the like. For example, a discovery module 104 may process a web page of a server 108 of a service provider 108 (e.g., parse and/or search a hypertext markup language (HTML) file) to estimate an input location for the user's electronic credentials, an instruction for submitting a user's electronic credentials, a location of event data associated with the user, an input location for information of a different service provider 108, an instruction for submitting the information of the different service provider 108, or the like.

A discovery module 104, in certain embodiments, may provide an advanced interface for a user to graphically repair broken and/or failed instructions for accessing a user's data from a server 108 of a service provider 108, which allows a user to view code of a webpage (e.g., HTML or the like) and to identify an input location for the user's electronic credentials, an instruction for submitting a user's electronic credentials, a location of data associated with the user, or the like within the code of the webpage. In one embodiment, a discovery module 104 may provide a basic interface for a user to graphically repair broken and/or failed instructions for accessing a user's data from a server 108 of a service provider 108 by overlaying a basic interface over a web page or other location of the server 108 wherein the user may graphically identify an input location for the user's electronic credentials, an instruction for submitting a user's electronic credentials, a location of data associated with the user, or the like (e.g., without requiring the user to view HTML or other code of the web page). A discovery module 104, in certain embodiments, may provide an interface that includes a selectable list of broken and/or missing instructions, locations, or the like, and may highlight and/or display suggestions graphically in response to a user selecting an item from the list.

A discovery module 104, in one embodiment, may test instructions provided by users (e.g., using a test set) before allowing each of the discovery modules 104a to use the provided instructions (e.g., to prevent an abusive user from providing false or incorrect instructions). A discovery module 104 may score or rate users based on a success rate of the users' provided instructions, and may expedite (e.g., provide to a greater number of discovery modules 104a and/or users) the use of instructions from users with a higher score or rating. The distributed network of discovery modules 104, in certain embodiments, may thereby be self-healing and/or self-testing, allowing continued access to and/or aggregation of users' data from one or more service providers 108, even if access instructions change or become broken.

The one or more discovery modules 104, in certain embodiments, may provide an interface (e.g., an application programming interface (API)) to provide downloaded and/or aggregated user data from servers 108 of one or more service providers 108 to one or more other entities (e.g., a remote server 110 or other hardware device 102 unaffiliated with the service provider 108, a backend discovery module 104b, or the like). The interface, in one embodiment, comprises a private interface between discovery modules 104a of users' hardware devices 102 and one or more backend discovery modules 104b. For example, this may enable a backend discovery module 104b to provide a user with access to downloaded and/or aggregated user data and/or to prompt a user to migrate an account, at multiple locations, on multiple hardware devices 102, through multiple channels, or the like, even if the user's hardware device 102 which downloaded the data is turned off, out of battery, not connected to the data network 106, or the like. In another embodiment, the interface comprises a public and/or open interface, which may be secured, allowing a user to share the user's downloaded data from a discovery module 104 to one or more other tools, services, and/or other entities to store, process, and/or otherwise use the data.

In various embodiments, a discovery module 104 may be embodied as hardware, software, or some combination of hardware and software. In one embodiment, a discovery module 104 may comprise executable program code stored on a non-transitory computer readable storage medium for execution on a processor of a hardware device 102, a backend server 110, or the like. For example, a discovery module 104 may be embodied as executable program code executing on one or more of a hardware device 102, a backend server 110, a combination of one or more of the foregoing, or the like. In such an embodiment, the various modules that perform the operations of a discovery module 104, as described below, may be located on a hardware device 102, a backend server 110, a combination of the two, and/or the like.

In various embodiments, a discovery module 104 may be embodied as a hardware appliance that can be installed or deployed on a backend server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, a discovery module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of a discovery module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to a discovery module 104.

A discovery module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, a discovery module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of a discovery module 104.

The semiconductor integrated circuit device or other hardware appliance of a discovery module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of a discovery module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more service providers 108, in one embodiment, may include one or more network accessible computing systems such as one or more web servers hosting one or more web sites, an enterprise intranet system, an application server, an application programming interface (API) server, an authentication server, or the like. The one or more service providers 108 may include systems related to various institutions or organizations. For example, a service provider 108 may include a system providing electronic access to a financial institution, a university, a government agency, a utility company, an email provider, a social media site, a photo sharing site, a video sharing site, a data storage site, a medical provider, a SaaS provider, a software publisher, a subscription media provider (e.g., a streaming and/or downloadable audio, video, and/or e-book provider), an e-commerce website, and/or another entity that stores data and/or hosts an account associated with a user. A service provider 108 may allow users to create user accounts to upload, view, create, and/or modify data associated with the user, to perform transactions (e.g., a loan account, a deposit account, a credit card account, a mortgage account, a vehicle loan account, a student loan account, an electronic payment provider account, or the like), and/or to otherwise generate data associated with the user and/or with the user's account. Accordingly, a service provider 108 may include an authorization system, such as a login element or page of a web site, application, API, or similar front-end, where a user can provide credentials, such as a username/password combination, to access the user's data, migrate or transfer a user's account to another service provider 108, or the like.

Figure 2:
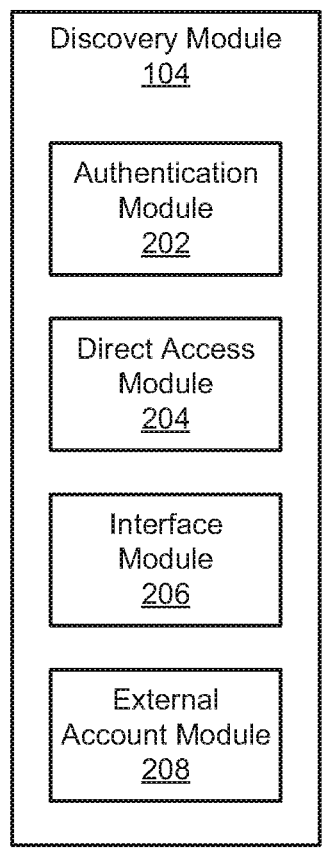
FIG. 2 is a schematic block diagram of one embodiment of a discovery module.

FIG. 2 depicts one embodiment of a discovery module 104. In the depicted embodiment, the discovery module 104 includes an authentication module 202, a direct access module 204, an interface module 206, and an external account module 208.

In one embodiment, the authentication module 202 receives a user's electronic credentials for a service provider 108 from the user on a hardware device 102 of the user. In a further embodiment, the authentication module 202 may receive electronic credentials for a different user (e.g., from a different hardware device 102, from a backend discovery module 104, or the like), which may be encrypted and/or otherwise secured, so that the direct access module 204 may download data for the different user (e.g., downloading data for multiple users from a single user's hardware device 102).

For example, in the distributed/decentralized system 100, if one user's hardware device 102 is turned off, asleep, out of battery, blocked by a service provider 108, or the like, in certain embodiments, a discovery module 202 on a different user's hardware device 102 and/or on a backend server 110 may download data for the one user, using the one user's electronic credentials, and may send the data to the one user's hardware device 102, may send an alert and/or push notification to the one user's hardware device 102, or the like. In this manner, in one embodiment, a user may continue to aggregate data, receive alerts and/or push notifications, or the like, even if the user's own hardware device 102 is blocked, unavailable, or the like. In cooperation with one or more authentication modules 202, the discovery modules 104*a*, 104*b*, in certain embodiments, may communicate with each other using a secure and/or encrypted protocol, and/or may store electronic credentials in a secure and/or encrypted manner, so that a user may not see and/or access another user's electronic credentials, downloaded data, or other private and/or sensitive data.

In embodiments where a discovery module 104 comprises hardware (e.g., a semiconductor integrated circuit device such as an FPGA, an ASIC, or the like), the authentication module 202 may comprise dedicated security hardware for storing and/or processing electronic credentials, downloaded data, and/or other sensitive and/or private data, such as a secure cryptoprocessor (e.g., a dedicated computer on a chip or microprocessor embedded in a packaging with one or more physical security measures) which does not output decrypted data to an unsecure bus or storage, which stores cryptographic keys, a secure storage device; a trusted platform module (TPM) such as a TPM chip and/or TPM security device; a secure boot ROM or other type of ROM; an authentication chip; or the like. In another embodiment, the authentication module 202 may store and/or process electronic credentials, downloaded data, and/or other sensitive data in a secure and/or encrypted way using software and/or hardware of a user's existing hardware device 102 (e.g., encrypting data in RAM, NAND, and/or other general purpose storage) with or without dedicated security hardware. In certain embodiments, the authentication module 202 may encrypt and/or secure data (e.g., electronic credentials, downloaded data) associated with a first user that is received by, processed by, and/or stored by a second (e.g., different) user's hardware device 102 (e.g., from the first user's hardware device 102 over the data network 106 or the like), preventing the second user from accessing the first user's data while still allowing the first user's data to be downloaded and/or aggregated from a different user's hardware device 102.

In one embodiment, as described above, electronic credentials may comprise one or more of a username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or other information whereby the authentication module 202 may authenticate and/or validate an identity of and/or an authorization of a user.

The authentication module 202, in certain embodiments, may receive different credentials from a user for different accounts of the user with different service providers 108 (e.g., different social networks, different photo sharing sites, different financial institutions) so that the discovery module 104 may download, aggregate, and/or combine the user's data from the multiple different service providers 108. In one embodiment, as described below with regard to the password manager module 306 of FIG. 3, the authentication module 202, instead of and/or in addition to receiving one or more passwords or other electronic credentials from a user, may manage and/or determine one or more passwords or other electronic credentials for a user for one or more service providers 108. For example, in certain embodiments, the authentication module 202 may receive an initial set of electronic credentials (e.g., a username and a password) from a user for an account of the user with a service provider 108, and the authentication module 202 may use the initial set of electronic credentials to access the user's account with the service provider 108 to set a new password, determined by the authentication module 202. The authentication module 202, in one embodiment, may determine passwords or other electronic credentials that are more secure than those typically created by and/or memorable to a user (e.g., longer, more numbers, greater variation between capital and lowercase letters, more frequently changed, or the like).

In one embodiment, the direct access module 204 accesses one or more servers 108 of one or more service providers 108, from a hardware device 102 of a user and/or from a backend server 110, using a user's electronic credentials from the authentication module 202 (e.g., for the user associated with the hardware device 102, for a different user, or the like). The direct access module 204, in certain embodiments, downloads data associated with a user (e.g., a user's social media posts, a user's photos, a user's financial transactions, or the like) from one or more servers 108 of one or more service providers 108 to a hardware device 102 of a user (e.g., of the user associated with the downloaded data, of a different user for processing and/or for transfer to the hardware device 102 of the user associated with the downloaded data, or the like) and/or to a backend server 110 associated with the direct access module 204, instead of or in addition to downloading the data directly to a hardware device 102 of the user (e.g., based on an availability of the hardware device 102 of the user, to backup the data in a second location, or the like).

The direct access module 204, in certain embodiments, may use a webpage interface of a server 108 of a service provider 108 to access the server 108 using a user's electronic credentials and/or to download data associated with the user. For example, in certain embodiments, the direct access module 204 may download/load a webpage from a server 108 of a service provider 108, enter a username and password or other electronic credentials for a user into textboxes in a form on the webpage, submit the username and password or other electronic credentials using a submit button or other interface element of the webpage, and/or otherwise submit electronic credentials using a website to gain authorized access to data on the server 108 associated with the user. As described below, the pattern module 308 may receive and/or provide instructions enabling the direct access module 204 to access a server 108 (e.g., a location or method for submitting electronic credentials, or the like).

In response to successfully authenticating with and accessing a server 108 of a service provider 108 with a user's electronic credentials, the direct access module 204 may download data associated with the user (e.g., from a user's account or the like) from the server 108, to a hardware device 102 associated with the user, to a backend server 110, to a hardware device 102 of another user downloading the data in proxy for the user, or the like. As described below, in certain embodiments, the pattern module 308 may receive and/or provide instructions enabling the direct access module 204 to download data associated with a user from a server 108 of a service provider 108 (e.g., a URL or other link to a location for the data, a label or other identifier for locating the data within one or more webpages or other data structures, or the like). The direct access module 204, in certain embodiments, may follow instructions from a pattern module 308 to authenticate and/or access data from one or more webpages from a server 108 in a screen scraping manner, parsing one or more webpages to locate an entry location and/or submit electronic credentials; to locate, download, and/or extract data associated with a user; or the like.

In one embodiment, the direct access module 204 sends or otherwise submits electronic credentials and/or receives or otherwise downloads data using an API or other access protocol of a server 108 of a service provider 108. For example, the direct access module 204 may send a request in a format specified by and/or compatible with a server 108 (e.g., an API server 108) of a service provider 108. The sent request may comprise electronic credentials for a user or a portion thereof (e.g., a username and/or a password), a subsequent request may comprise electronic credentials for a user or a portion thereof (e.g., in response to receiving an acknowledgment from the server 108 for the first request, or the like), and/or the direct access module 204 may use a different access protocol of a server 108.

In response to a request for data from the direct access module 204 (e.g., in response to the direct access module 204 authenticating a user using an access protocol of a server 108), a server 108 of a service provider 108 may send and/or return data associated with a user (e.g., in one or more messages, packets, payloads, as a URL or other pointer to a location from where the direct access module 204 may retrieve the data, or the like). The direct access module 204, in various embodiments, may receive data associated with a user directly from a server 108 of a service provider 108 over a data network 106; may receive a pointer, URL or other link to a location of data associated with a user from a server 108 of a service provider 108; may receive data associated with a user from another entity on a data network 106 (e.g., in response to a request from the server 108 of the service provider 108 to the other entity or the like); or may otherwise receive data associated with a user according to an access protocol of a service provider 108.

In one embodiment, a service provider 108 provides a direct access module 204 with an API or other access protocol. In a further embodiment, a direct access module 204 may act as a wrapper for and/or a plugin or extension of, an application of a service provider 108 (e.g., a mobile application), and the application may have access to an API or other access protocol of the service provider 108. In another embodiment, a direct access module 204 may be configured to use an API or other access protocol in a same manner as an application of a service provider 108 (e.g., a mobile application), through observation of the application of the service provider 108 or the like. In certain embodiments, a direct access module 204 may cooperate with an application of a service provider 108, a web browser through which a user accesses services of a service provider 108, or the like to access data associated with a user (e.g., accessing data already downloaded by an application and/or user, accessing a database or other data store of an application and/or web browser, scanning and/or screen scraping a web page of a service provider 108 as a user accesses the web page, or the like).

The direct access module 204, in certain embodiments, may access different service providers 108 in different manners. For example, a first service provider 108 may grant the direct access module 204 with access to an API or other access protocol, while the direct access module 204 may use a web page interface (e.g., screen scraping) to access and download data from a second service provider 108, or the like. In one embodiment, a remote backend server 110 may be associated with a first party service provider 110 (e.g., a vendor and/or provider of a discovery module 104) and the direct access module 204 may download data associated with a user from both the first party service provider 110 and from one or more service providers 108, aggregating the data together so that the user may access the data in a single interface and/or application. For example, as described below with regard to the interface module 206, the interface module 206 may provide a user access to the user's photos from multiple cloud storage providers 108 within a single photo application, may provide a user with access to the user's personal financial information within a single personal financial management application and/or online banking application, may provide a user with access to posts from multiple social networks within a single social networking application, or the like.

The direct access module 204, in certain embodiments, may store downloaded and/or aggregated data independently from the one or more service providers 108. For example, the direct access module 204 may store a user's downloaded and/or aggregated data on a hardware device 102 of the user, on a backend server 110 accessible by the user, or the like. In this manner, in certain embodiments, a user may control and/or access the user's data, even if a service provider 108 closes down or is not available, may use the user's data in any manner desired by the user even if the use is not supported by a service provider 108, or the like.

The direct access module 204, in one embodiment, in addition to and/or instead of downloading data from one or more service providers 108, may upload data to and/or change one or more settings of one or more service providers 108, in response to user input or the like. For example, in embodiments where the data comprises photos, the direct access module 204 may upload a photo from a hardware device 102 of the user to one or more service providers 110 (e.g., a downloaded photo that the user has edited on the hardware device 102 or the like). In embodiments where the data comprises social media posts or other content, the direct access module 204 may receive input from a user (e.g., a photo, a textual post, one or more emoji, a video, a document or other file, or the like) and upload the received input to one or more service providers 108 (e.g., social media sites or the like). In embodiments where the data comprises financial transactions or other financial data, the direct access module 204 may schedule a bill pay or other payment or funds transfer, remotely deposit a check (e.g., by uploading photos of the front and/or back of the check, or the like), and/or perform another action.

The direct access module 204 may update or change a user's account information with a service provider 108, such as an account type or plan, credit card or other payment information associated with an account, a phone number or address or other contact information associated with an account, a password or other electronic credentials for an account, and/or other account information of a user for a service provider 108. The direct access module 204 may update and/or upload data in a substantially similar manner to that described herein for downloading data (e.g., determining a user's electronic credentials for a service provider 108, accessing a server 108 of the service provider 108, uploading and/or providing data to the service provider 108, or the like).

In one embodiment, the interface module 206 provides a user's data downloaded by the direct access module 204, from a hardware device 102 of a user (e.g., of the user associated with the downloaded data, of a different user) to another entity, such as a hardware device 102 of a user associated with the downloaded data (e.g., in response to the data being downloaded by a hardware device 102 of a different user, from one hardware device 102 of a user to another hardware device 102 of the same user), a remote server 110 or other remote device 102 unaffiliated with (e.g., not owned by, operated by, controlled by, or the like) the service provider 108 from which the data was downloaded, or the like. For example, the interface module 206 may provide an API or other interface to provide a user's downloaded and/or aggregated data to a hardware device 102 of the user, to a backend discovery module 104b, to a backend server 110, to a different service provider 108, to a different/second hardware device 102 of the user, or the like.

In certain embodiments, it may be transparent and/or substantially transparent to a user (e.g., not apparent) which hardware device 102, 110 has downloaded data associated with the user. For example, the interface module 206 may provide downloaded data associated with a user from one hardware device 102 of the user to another hardware device 102 of the user, from a hardware device 102 of the user to a backend server 110 (e.g., from which the user may access the data using a web browser, an application, or the like), from a backend server 110 to a hardware device 102 of the user, or the like, allowing the user to access the data from a different location than the location to which the data was downloaded.

In certain embodiments, the interface module 206 provides a graphical user interface (GUI) on a hardware device 102 of a user, and provides downloaded data associated with the user to the user through the GUI (e.g., allowing the user to view the data directly, providing one or more notifications and/or recommendations to the user based on the data, providing one or more tables or charts to the user based on the data, providing a summary of or one or more statistics related to the data, or the like). The interface module 206, in various embodiments, may provide a GUI to the user from the same hardware device 102 to which the data was downloaded, on a different hardware device 102 than the hardware device 102, 110 to which the data was downloaded, or the like.

For example, in one embodiments, where the data associated with a user comprises photos, the interface module 206 may provide a photo management interface, a photo editing interface, or the like wherein the user may view and/or otherwise access the user's downloaded and/or aggregated photos. In a further embodiment, where the data associated with a user comprises the user's financial transaction history (e.g., purchases and/or other financial transactions downloaded from one or more financial institutions 108 such as banks, credit unions, lenders, or the like), the interface module 206 may provide a personal financial management interface, with a list of transactions, one or more budgets, one or more financial goals, a debt management interface, a net worth interface, and/or another personal financial management interface wherein the user may view the user's downloaded and/or aggregated financial transaction history, and/or alerts or recommendations based thereon. In another embodiment, where the data associated with a user comprises social media posts, the interface module 206 may provide a GUI comprising a stream, feed, and/or wall of social media posts for the user to view (e.g., downloaded and/or aggregated social media posts from multiple social networks 108, from different contacts or friends of the user, or the like).

The interface module 206, in certain embodiments, may provide one or more access controls to a user, allowing the user to define which devices 102, users, service providers 110, or the like may access which data. For example, the interface module 206 may provide an interface for a user to allow and/or restrict certain mobile applications, certain APIs for third party services, certain plugins or extensions, certain users, certain hardware devices 102, and/or one or more other entities to access data downloaded for the user from one or more party service providers 108 (e.g., with access controls by service provider 108 or other data source, by data type, by entity requesting access, and/or at another granularity). In this manner, the discovery module 104, in certain embodiments, may comprise a local repository of aggregated data, which one or more other devices 102 and/or services may access and use, with a user's permission.

In one embodiment, an external account module 208 is configured to switch, migrate, and/or transfer one or more of a user's accounts, services, transactions, or the like between service providers 108. An external account module 208 may identify an account, service, transaction, or the like to migrate by processing aggregated data (e.g., an aggregated set of transactions) from one or more servers 108 (e.g., downloaded from one or more service providers 108, from one or more first party service providers 108 associated with the backend server 110, from one or more aggregation servers 108, and/or the like). An external account module 208 may identify one or more repeating transactions from a set of transactions, prompt a user to migrate one or more accounts, services, transactions, or the like from one service provider 108 to a different service provider 108, and/or migrate one or more accounts, services, transactions, or the like to a different service provider 108, or the like.

Many users may desire to switch service providers 108. However, service providers 108 may make the process difficult, or users may not want to go through the headache of making the switch, even if a different service provider 108 provides better features, quality, price, or another attribute than a current service provider 108. An external account module 208, in certain embodiments, identifies external accounts associated with an external and/or third party service provider 108, and provides an interface allowing a user to switch or migrate the external account to a different service provider 108 (e.g., a different software as a service (SaaS) provider; a different data repository; a different social network; a different payment source such as a debit card, credit card, financial account, loan, online payment system account, or the like; a different entity and/or institution; or the like).

An external account module 208 may comprise and/or be part of a trusted hardware device 102, 110, which is secure and authorized by a user to store and/or use one or more of the user's electronic credentials or other important data. An external account module 208 may be provided by a government entity, an educational institution, a financial institution, and/or another entity which the user trusts and/or authorizes to act in its behalf. For example, an external account module 208 may be provided by a service provider 108 associated with the backend server 110, allowing users to migrate and/or switch one or more accounts, services, transactions, or the like from other service providers 108 to the first party service provider 108 providing the discovery module 104 (e.g., a social network 108's application or website may provide a discovery module 104 as a browser plugin, a mobile application, installable software, or the like that discovers other social media accounts of a user and prompts the user to migrate and/or switch a social media post to the social network; a financial institution 108's mobile application and/or web site may discover payments to a loan, transfers to another financial account, or the like and prompt a user to switch, transfer, and/or migrate the loan, the other financial account, or the like from a competitor 108 to the financial institution 108; an operating system for a hardware device 102 may comprise a discovery module 104 that discovers a user's antivirus account, data backup account, or other account, and may prompt the user to migrate and/or switch the identified account from a third party service provider 108 to a service provider 108 associated with the operating system; or the like).

In this manner, one or more discovery modules 104 may automate and/or simplify the detection of accounts, services, and/or transactions that are external to a service provider 108 and/or backend server 110, and the migration and/or transfer of a discovered account, service, transaction, or the like from one service provider 108 to a different service provider 108, with minimal interaction with a user (e.g., accepting a prompt, providing and/or authorizing use of electronic credentials, or the like), rather than requiring a user to contact a service provider 108 to manually migrate and/or transfer an account, service, and/or transaction.

A transaction, as used herein, may comprise a detected and/or recorded electronic occurrence or the like associated with a user, a user's hardware device 102, a user's account, or the like. A transaction, in various embodiments, may occur on and/or may be detected and/or recorded by a discovery module 104, a service provider 108, a backend server 110, a hardware device 102 of a user, one or more sensors, or the like. For example, in various embodiments, a transaction may comprise one or more of a data backup event for a hardware device 102 of a user over a data network 106 (e.g., to a service provider 108), an antivirus and/or security scan event for a hardware device 102 of a user (e.g., periodically scanning files and/or data storage of a hardware device 102 to locate one or more viruses, malware, bots, worms, rootkits, and/or other security risks using software and/or definitions provided by one or more service providers 108), a software and/or firmware update event for a hardware device 102 of a user (e.g., an operating system update, a software patch, an application update, and/or another update downloaded and/or installed from a service provider 108 over a data network 106), an electronic subscription transaction for a data network service (e.g., a renewal, a payment, or the like), an electronic financial transaction (e.g., a loan payment, a credit or debit card payment, a direct deposit, an electronic bill payment, an automated clearing house (ACH) payment, an online and/or electronic money transfer, a mobile and/or wireless payment, or the like to a third party service provider 108, a financial institution, website, merchant, vendor, individual, and/or other entity), or the like.

A subscription transaction may include renewing a subscription, paying for a subscription, or the like. A data network service may comprise a digital and/or electronic service that may occur over and/or using a data network 106, such as a cloud software and/or software as a service (SaaS) subscription, a streaming and/or downloadable media subscription (e.g., video, audio, e-books, or the like), an internet service subscription, a cable television subscription, a subscription made over a data network 106 for delivery of digital and/or physical goods and/or services, or the like.

A repeating transaction may comprise a transaction that occurs more than once. Different occurrences of a repeating transaction, in certain embodiments, may comprise at least one attribute in common (e.g., and/or may have one or more attributes that are different). For example, different occurrences of a repeating transaction may be associated with the same service provider 108, website, and/or other entity; may occur on or around the same time, periodically (e.g., at or around the same time each day; on the same day and/or within a few days each week, month, quarter, year, or other time period; or the like); may be associated with the same or similar transaction amount (e.g., within a predefined percentage or amount); and/or have one or more other similarities.

An external account module 208 may be configured to select one or more repeating transactions having at least a threshold number of similarities, may only select one or more repeating transactions having one or more required similarities, or the like. In one embodiment, an external account module 208 may provide an interface (e.g., a graphical user interface (GUI), an application programming interface (API), a command line interface (CLI), and/or another interface) allowing a user (e.g., an end user on a hardware device 102, an administrator of a backend server 110, or the like) to select or otherwise define one or more rules for the external account module 208 to identify one or more repeating transactions, such as a rule defining a threshold number of similarities for a repeated transaction, a rule requiring one or more similarities for a repeated transaction, a rule allowing one or more differences for a repeated transaction, or the like.

In certain embodiments, a recurring transaction is a type of repeated transaction with one or more predefined similarities, such as a repeated transaction that occurs on or around the same time during each of a plurality of time periods (e.g., at or around the same time each day; on the same day and/or within a few days each week, month, quarter, year, or other time period; or the like) and/or is associated with the same or similar (e.g., within a predefined percentage or amount) transaction amount, or the like. In one embodiment, an external account module 208 may be configured to identify any repeating transaction (e.g., including recurring and non-recurring transactions). In a further embodiment, an external account module 208 may be configured to identify only recurring transactions.

An external account module 208, in one embodiment, may download, aggregate, and/or otherwise collect or receive a set of transactions (e.g., a log, a listing, a history, a file, a data structure, and/or another record of one or more transactions), in which the external account module 208 may identify one or more repeating transactions or the like for migrating and/or switching. For example, an external account module 208 may aggregate transactions comprising a user's posts to one or more social media networks 108, may aggregate system and/or application logs from one or more hardware devices 102, may aggregate transactions from one or more electronic calendar or scheduling services 108, may aggregate images from one or more image sharing and/or backup services 108, may aggregate financial transactions from one or more financial institutions 108, may aggregate online orders from one or more e-commerce services 108, and/or may aggregate a set of transactions from one or more servers 102, 108, 110.

An external account module 208, in one embodiment, may download and/or aggregate a set of transactions directly from one or more servers 108 of one or more service providers 108 (e.g., using a user's electronic credentials for a specific service provider 108 to access an API, CLI, web interface by web crawling and/or screen scraping, or the like). In a further embodiment, an external account module 208 may download and/or aggregate a set of transactions from one or more intermediaries, such as an aggregation server 108 that provides access to transaction data from one or more other service providers 108 (e.g., an external account module 208 may provide a user's electronic credentials to an aggregation server 108 or other intermediary which may have access to multiple other service providers 108 and may provide transaction data from one or more of the other service providers 108 to the external account module 208). In light of this specification, one of skill in the art will recognize many sources which an external account module 208 may use to aggregate a set of transactions from one or more servers 108 to a trusted device 102, 110.

For example, in one embodiment, a discovery module 104*b* is disposed on a backend server 110, and may aggregate sets of transactions for a plurality of different users (e.g., using and/or associated with different hardware devices 102 and/or discovery modules 104*a*) at a central location comprising the backend server 110. In a further embodiment, a distributed and/or decentralized array of multiple discovery modules 104*a* may each download and/or aggregate a set of transactions for individual users on the users' own hardware devices 102.

An external account module 208, in certain embodiments, may aggregate a set of transactions from one type of service provider 108 in order to identify and migrate an account, service, transaction, or the like for another type of service provider 108. For example, an external account module 208 may aggregate financial transactions from one or more financial institution service providers 108 that have issued debit and/or credit cards to a user; where a user has a checking, savings, or other financial account; or the like in order to identify repeating events for one or more other types of service providers 108 (e.g., a SaaS provider, a software publisher, a subscription media provider, an e-commerce website, a merchant, a vendor, a mobile wallet provider, an antivirus provider, a utility company, an email provider, a social media site, a photo sharing site, a video sharing site, a data storage site, a medical provider, or the like).

In one embodiment, an external account module 208 may aggregate financial transactions from accounts of one or more financial institution service providers 108 (e.g., checking accounts, savings account, other deposit accounts) to discover one or more externally held accounts (e.g., loans, checking accounts, savings accounts, other financial accounts) at a different financial institution service provider 108, which the user has not yet aggregated using the external account module 208. For example, an external account module 208 may identify, in aggregated transactions, one or more payments from a checking and/or savings account at a first financial institution 108, to pay a loan (e.g., a vehicle loan, a mortgage, a student loan, a personal loan, a business loan, or the like) at a second financial institution 108, electronic credentials for which the user has not yet provided to the external account module 208. In response to discovering an externally held account of a user that has not yet been aggregated, an external account module 208 may prompt the user for electronic credentials for aggregating the discovered externally held account, may prompt the user to transfer and/or replace the discovered externally held account with an account from the service provider 108 associated with the external account module 208, or the like.

An external account module 208 may use a first set of electronic credentials of a user to aggregate a set of transactions (e.g., directly and/or indirectly from one or more financial institutions to aggregate financial transaction data, or the like) and, in response to identifying a transaction to an externally held account, from an externally held account, or the like, may prompt the user to aggregate the externally held account (e.g., request electronic credentials for the externally held account); may prompt the user to migrate, transfer, and/or replace the externally held account (e.g., with a similar account provided by a service provider 108 associated with the external account module 208, the back-end server 110, or the like). In response to receiving authorization from the user accepting the prompt, the external account module 208 may use a second set of electronic credentials of the user to download data from the externally held account (e.g., to aggregate data from the account); to migrate, transfer, and/or replace the externally held account with one from a different service provider 108; or the like.

An external account module 208 may be configured to process aggregated and/or downloaded transaction data from one service provider 108 to identify one or more externally held accounts a user has with a different service provider 108. For example, an external account module 208 may identify a predefined text string, identifier, or the like in one or more transactions (e.g., a text string associated with the different service provider 108), may identify a pattern in timing (e.g., time of day, day of the week, day of the month, day of the year, week of the year, month of the year, or the like) based on a timestamp or other date record for one or more transactions, may correlate numerical values for different instances of a repeating transaction (e.g., the same value or within a threshold amount of the same value; the same monetary amount or within a threshold amount of the same monetary amount; or the like), may identify a similar event identifier and/or service provider 108 identifier (e.g., a name, URL or other address, or the like), may use artificial intelligence and/or machine learning to correlate transaction data to identify an externally held account (e.g., based on payments, money transfers, or the like to or from the externally held account from a first party account), and/or may otherwise identify one or more externally held accounts with a different service provider 108 based on transactions from a first service provider 108.

A central discovery module 104b, in certain embodiments, may process aggregated sets of transactions for multiple users (e.g., each of a service provider 108's users, or the like) to identify externally held accounts and may dynamically target and/or select certain externally held accounts for certain users based on the aggregated sets of transactions. For example, in one embodiment, an external account module 208 may determine whether or not to prompt a user to migrate, transfer, and/or replace an externally held account (e.g., refinance and/or replace a loan, or the like) based on an estimated value of the externally held account, based on a likelihood that the user will migrate, transfer, and/or replace the externally held account, based on an age of the externally held account, based on an estimated interest rate of the externally held account (e.g., estimated based on a size/amount of a recurring payment to the externally held account, or the like), based on a transaction history and/or other metadata the external account module 208 maintains for the user, based on an estimated value to the service provider 108 receiving the transferred/replaced externally held account, or the like.

In one embodiment, an external account module 208 selects a user for migrating, transferring, and/or replacing an externally held account and/or selects an externally held account for migrating, transferring, and/or replacing in response to the user's externally held account satisfying a selection metric (e.g., an externally held account type, a service provider 108 holding the externally held account, an estimated value of the externally held account, or the like). As used herein, a selection metric may include a measurable and/or estimable quantity or unit of an externally held account that an external account module 208 may use to select a user and/or an externally held account for migrating, transferring, and/or replacing with a different service provider 108. A selection metric, in various embodiments, may include a lifetime value metric, a total spend metric, a transaction interval metric, an interest rate metric, a sum total spent on an externally held account, a price per repeating transfer/payment to an externally held account, a monthly payment amount for an externally held account, a profit margin for an externally held account, a fee for an externally held account, a geographical metric, an income metric for a user associated with an externally held account, a savings metric associated with an externally held account, and/or the like.

A selection metric, in one embodiment, comprises a lifetime value metric indicating a projected and/or estimated total value of a user to a different service provider 108 to which an externally held account is migrated, transferred, and/or replaced (e.g., based on the user's aggregated set of transactions and/or on a cost of the migration to the different service provider 108), or the like. For example, an external account module 208 may determine and/or estimate, based on a user's aggregated set of transactions, an amount the user is likely to spend on the externally held account (e.g., based on previous costs and/or profits associated with the externally held account), how loyal a user is likely to be to the different service provider 108 after the migration (e.g., based on a determined amount of time the user has used the previous service provider 108, how often the user has previously migrated the externally held account, or the like), or the like, and may determine a lifetime value metric based on one or more of the foregoing determinations.

A selection metric, in certain embodiments, comprises a total spend metric indicating a confidence of whether a user's aggregated set of transactions includes each of the user's transactions of an associated transaction type (e.g., each of the user's transactions associated with the externally held account, each of the user's financial transactions from multiple financial institutions 108 for aggregated financial data, each of the user's social media posts from multiple social media networks 108 for aggregated social media data, or the like), aggregated from multiple entities (e.g., banks, credit unions, credit card companies or other lenders, payment processing companies, online payment providers, and/or the like for financial transaction events). If there is a low confidence or probability that an external account module 208 has access to each of the user's transactions of a certain type (e.g., a complete and/or substantially complete financial snapshot for the user for aggregated financial transactions), it may be unlikely that an external account module 208's determination of whether the user's financial transaction data satisfies a selection metric associated with an externally held account is accurate, and a new service provider 108 may therefore find the user a poor candidate for migrating, transferring, and/or replacing the externally held account, due to the uncertainty of whether the user's aggregated transaction data is complete. Conversely, if there is a high confidence or probability that an external account module 208 has access to each of a user's transactions for the user of a transaction type (e.g., a complete and/or substantially complete financial snapshot for the user for aggregated financial transactions), a new service provider 108 may have greater trust in an external account module 208's selection of the user, and may prompt the user to migrate, transfer, and/or replace the externally held account with greater certainty.

An external account module 208, in certain embodiments, may analyze and/or process a user's aggregated set of transactions using one or more rules, flags, indicators, and/or the like, to determine a total spend metric indicating a confidence of whether the user's aggregated set of transactions includes each of the user's transactions of a transaction type (e.g., associated with an externally held account, over a predefined period, or the like). For example, in one embodiment, an external account module 208 may start at a default confidence level (e.g., 50%, 0.5, 0%, 0, 100%, 1, or the like) and may adjust the confidence level for a user's aggregated set of transactions based on one or more confidence factors. An external account module 208, in certain embodiments, may decrease a confidence level if one transaction in a transaction pair (e.g., two transactions that are often seen together within a predefined period) is missing, may increase a confidence level if both transactions in a transaction pair are present, or the like. For example, a transaction pair may include a mortgage payment and a utility payment; a payment credit on a credit card statement and a corresponding debit from a bank account; a car payment and fuel purchases; and/or another event pair.

In a further embodiment, an external account module 208 may increase a confidence level of a total spend metric if one or more predefined key transactions are present, and/or may decrease a confidence level of a total spend metric if one or more predefined key transactions are not present in the aggregated set of transactions for a user. A key transaction, in one embodiment, comprises a transaction that is expected to occur for each user within a predefined period. For example, a key transaction may comprise a direct deposit and/or payroll check deposit, a mortgage and/or rent payment, at least a threshold amount spent on a personal necessity (e.g., food), and/or another expected one or more transactions. In certain embodiments, an external account module 208 may be configured to prompt a user to add one or more additional accounts for one or more additional service providers 108 in response to determining a confidence level below a threshold for a total spend metric for the user. In another embodiment, an external account module 208 may query a user whether the user's aggregated set of transactions includes each of the user's transactions for a transaction type, and may base a confidence level of a total spend metric on the user's answer.

An external account module 208, in one embodiment, may determine a confidence level of a total spend metric and/or another selection metric by processing users' aggregated set of transactions using one or more predefined rules, or the like. In a further embodiment, an external account module 208 may determine a confidence level of a total spend metric and/or another selection metric dynamically, using machine learning or other artificial intelligence, or the like, causing an accuracy of an external account module 208's determinations to increase over time (e.g., at least up to a point) as an external account module 208 learns from and detects patterns in the aggregated set of transactions.

A geographical metric, in various embodiments, may indicate, based on a user's aggregated transaction data, a geographical location of a user, of a transaction, of a current service provider 108 for an externally held account, or the like. A geographic region, in certain embodiments, may comprise latitude/longitude coordinates, a street, a development, a district, a city, a county, a state, a country, and/or another identifiable geographic area.

A selection metric, in one embodiment, may comprise an income metric indicating a user's income (e.g., monthly, yearly, by source, gross income, disposable income, and/or the like). In a further embodiment, a selection metric may comprise a savings metric indicating an amount of money a user saves (e.g., balance of a savings/checking account; balance of an investment account; aggregated total of several savings/checking and/or investment accounts; total amount saved; amount saved over a time period such as daily, weekly, monthly, and/or yearly; a rate of saving; or the like).

A selection metric, in one embodiment, comprises a consistency metric indicating an amount of variation in spending for different transactions. A selection metric, in certain embodiments, may comprise a transaction interval metric indicating an amount of time spanned by a user's aggregated set of transactions (e.g., one month, two months, three months, six months, a year, two years, three years, and/or the like). For example, in one embodiment, a new service provider 108 for a long term or high valued externally held account, may prefer to prompt one or more users with a higher transaction interval metric (e.g., with a longer amount of time spanned by the users' aggregated set of transactions), while a new service provider 108 for a smaller value externally held account, may not have such a preference and my prompt users with a lower transaction interval metric (e.g., with a shorter amount of time spanned by the users' aggregated set of transactions).

In certain embodiments, an external account module 208 may provide an interface (e.g., a graphical user interface (GUI), an application programming interface (API), a command line interface (CLI), and/or the like) for an administrator or other user associated with a service provider 108 to set one or more thresholds whereby a user's aggregated set of transactions may satisfy a selection metric for migrating, transferring, and/or replacing an externally held account by the service provider 108. By setting one or more thresholds whereby a user's aggregated set of transactions may satisfy a transaction metric, a service provider 108 may target certain users for migrating externally held accounts based on the users' history of transactions. An external account module 208, in one embodiment, may allow a service provider 108 to select a cap and/or a minimum on a number of users that will receive a prompt to migrate an external account, to adjust one or more thresholds of a selection metric until at least a minimum number of users are selected, or the like.

In one embodiment, the one or more backend servers 110 and/or one or more backend discovery modules 104b provide central management of a network of discovery modules 104a for multiple users and/or hardware devices 102. For example, the one or more backend discovery modules 104b and/or a backend server 110 may store downloaded user data, transaction data, or the like from the discovery modules 104a centrally, may provide instructions for the discovery modules 104a to access user data and/or transaction data from one or more service providers 108 using user credentials, or the like. A backend server 110 may include one or more servers located remotely from the hardware devices 102 and/or the one or more service providers 108. A backend server 110 may include at least a portion of the modules or sub-modules described below with regard to the discovery modules 104 of FIG. 2 and FIG. 3, may comprise hardware of an external account module 208, may store executable program code of an external account module 208 in one or more non-transitory computer readable storage media, and/or may otherwise perform one or more of the various operations of an external account module 208 described herein in order to aggregate user data from one or more service providers 108.

Once an external account module 208 has migrated, transferred, and/or an externally held account to a different service provider 108, the external account module 208 may aggregate a subsequent set of transactions from the one or more servers 108 and may verify whether subsequent transactions for the externally held account remain migrated to the different service provider 108 (e.g., using a similar analysis to that described above to determine whether the different service provider 108 is still holding the account, or if the user has switched the account to another service provider 108). An external account module 208 may re-prompt the user to migrate, transfer, and/or replace the externally held account with the different service provider 108 if the external account module 208 detects that the externally held account has not remained migrated to the different service provider 108 (e.g., is no longer associated with and/or held by the different service provider 108).

If a user denies or rejects a prompting to migrate, transfer, and/or replace an externally held account with a different service provider 108, an external account module 208 may iteratively and/or periodically re-prompt the user to migrate, transfer, and/or replace the externally held account to the different service provider (e.g., until the user accepts a prompt and migrates the externally held account). In certain embodiments, an external account module 208 may include an offer or other incentive to the user in a prompt, such as a discount on a cost of the externally held account, a lower interest rate on the externally held account, a rebate, a certain number of points, a coupon, a gift card, or the like. When iteratively re-prompting a user, an external account module 208 may increase a value of an offer with each iteration, or the like.

Figure 3:
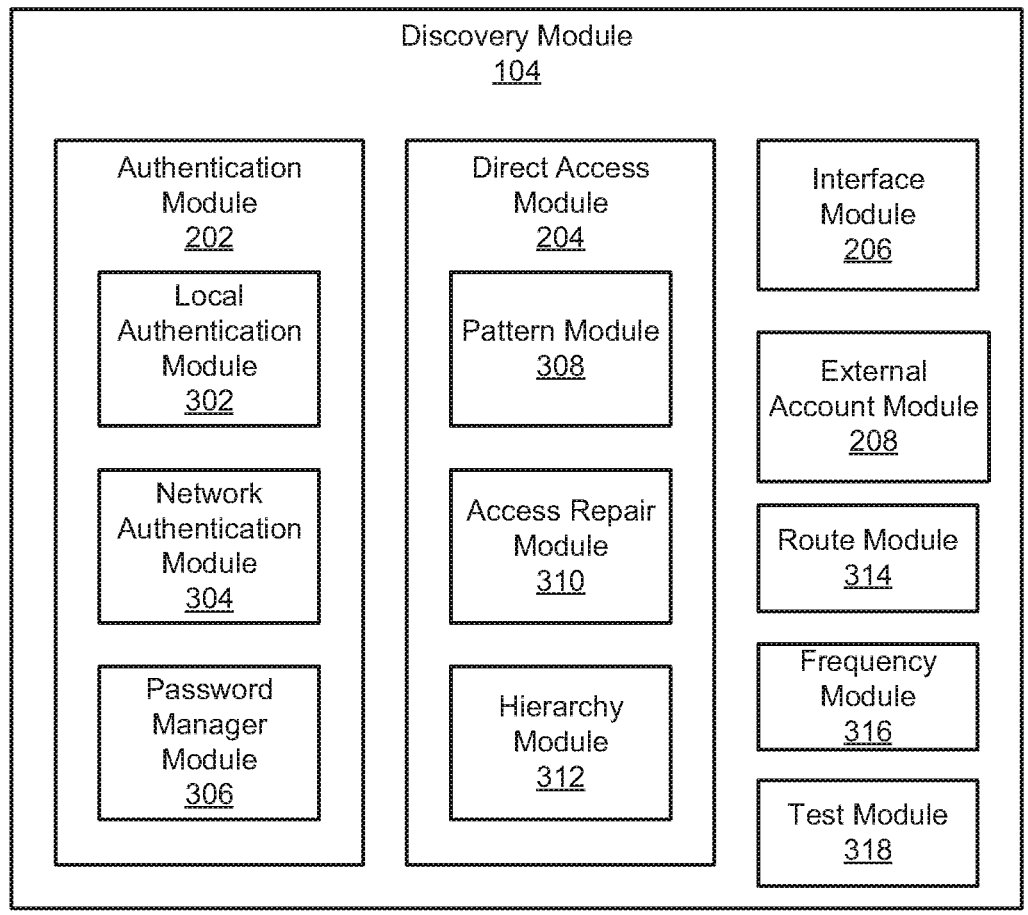
FIG. 3 is a schematic block diagram of another embodiment of a discovery module.

FIG. 3 depicts another embodiment of a discovery module 104. In the depicted embodiment, the discovery module 104 includes an authentication module 202, a direct access module 204, an interface module 206, and an external account module 208 and further includes a route module 314, a frequency module 316, and a test module 318. The authentication module 202, in the depicted embodiment, includes a local authentication module 302, a network authentication module 304, and a password manager module 306. The direct access module 204, in the depicted embodiment, includes a pattern module 308, an access repair module 310, and a hierarchy module 312.

In one embodiment, the local authentication module 302 secures and/or authenticates the user's access to downloaded data, to stored passwords, and/or other data on a user's hardware device 102, transferred to and/or from a user's hardware device 102, or the like. For example, the local authentication module 302 may cooperate with one or more security and/or authentication systems of the user's hardware device 102, such as a PIN, password, fingerprint authentication, facial recognition, or other electronic credentials used by the user to gain access to the hardware device 102. In a further embodiment, the local authentication module 302 may authenticate a user before allowing the interface module 206 to provide the user access to downloaded/aggregated data and/or alerts or other messages. For example, the local authentication module 302 may manage and/or access electronic credentials associated with the discovery module 104, for a user, and may authenticate the user in response to the user accessing an application and/or service of the discovery module 104.

In certain embodiments, the local authentication module 302 may encrypt and/or otherwise secure, on a user's hardware device 102, electronic credentials and/or downloaded data associated with a different user, so that the user may not access data associated with the different user, but the different user may access the data once it is transmitted to a hardware device 102 of the different user, to a backend server 110, or the like. Local authentication modules 302 of different hardware devices 102, 110 may cooperate to securely transfer data (e.g., one or more electronic credentials, downloaded data, or the like) over the data network 106, from one hardware device 102, 110 to another hardware device 102, 110. In a further embodiment, the local authentication module 302 may ensure that a user's electronic credentials and/or downloaded data remain on a single hardware device 102 (e.g., are not transmitted on a data network 106), in a secure repository or the like, and are not stored on and/or accessible to a backend server 110, a hardware device 102 of another user, or the like.

In one embodiment, the network authentication module 304 receives and/or stores a user's electronic credentials for one or more service providers 108 on a hardware device 102 of the user, on a backend server 110, or the like. The network authentication module 304, in various embodiments, may receive a user's electronic credentials from the user, from a hardware device 102 of the user, from a backend server 110, or the like. The network authentication module 304 may cooperate with the direct access module 204 to provide a user's electronic credentials to a server 108 of a service provider 108 (e.g., the network authentication module 304 may provide electronic credentials to the direct access module 204 to provide to a server 108, the network authentication module 304 may provide electronic credentials directly to a server 108, or the like).

The network authentication module 304, in certain embodiments, may cooperate with the local authentication module 302 to encrypt and/or otherwise secure a user's electronic credentials for one or more service providers 108, on a hardware device 102 of a user, on a data network 106, on a hardware device 102 of a different user, on a backend server 110, while being provided to a server 108 of a service provider 108, or the like. In a further embodiment, the network authentication module 304 ensures that a user's electronic credentials are only stored on a user's hardware device 102 and sent from the user's hardware device 102 to a server 108 of a service provider 108, and does not store a user's electronic credentials on a backend server 110, on a different user's hardware device 102, or the like. In another embodiment, the network authentication module 304 may securely store (e.g., using secure encryption) a user's electronic credentials for a service provider 108 on a backend server 110, on a different user's hardware device 102, or the like, so that a direct access module 204 may access and/or download data associated with the user, even if the hardware device 102 of the user is unavailable, blocked, or the like, as described below with regard to the route module 314. In certain embodiments, whether the network authentication module 304 and/or the local authentication module 302 allow electronic credentials to be sent to and/or stored by a different user's hardware device 102, a backend server 110, or the like may be based on a setting defined based on user input, so that the user may decide a level of security, or the like.

In one embodiment, the password manager module 306 may manage and/or store electronic credentials of a user for a plurality of service providers 108, so that the direct access module 204 may access and/or download data associated with the user from each of the plurality of service providers 108. The password manager module 306, in certain embodiments, may generate and/or otherwise manage different, secure, credentials for each of a plurality of service providers 108.

The password manager module 306, in one embodiment, may securely store generated credentials for a user on a hardware device 102 of the user, so that the user does not have to remember and enter the generated electronic credentials. For example, in addition to allowing a direct access module 204 to access a service provider 108 using generated electronic credentials, the password manager module 306 may automatically populate one or more interface elements of a form on a webpage with electronic credentials (e.g., a username, a password) of the user, in response to the user visiting the web page in a web browser, or the like, without the user manually entering the electronic credentials. The password manager module 306, in certain embodiments, may periodically update (e.g., regenerate different credentials, such as a different password, and update the user's account with the service provider 108 with the regenerated different credentials) electronic credentials for a user, such as every week, every month, every two months, every three months, every four months, every five months, every six months, every year, every two years, in response to a user request, in response to a request from a service provider 108, and/or over another time period or in response to another periodic trigger.

The password manager module 306, in one embodiment, may synchronize a user's electronic credentials (e.g., provided by the user, generated by the password manager module 306, or the like) across different hardware devices 102, web browsers, or the like of a user. For example, in response to a password manager module 306 and/or the user updating or otherwise changing electronic credentials, the password manager module 306 may propagate the update/change to one or more other password manager modules 306, on different hardware devices 102 of the user, or the like.

In one embodiment, the pattern module 308 determines an ordered list (e.g., a pattern, a script, or the like) of multiple locations on one or more servers 108 of a service provider 108 for the direct access module 204 to access the server (e.g., which may include locations other than where the data of the user is stored and/or accessible), one or more delays for the direct access module 204 to wait between accessing locations on the server 108, and/or other components of an access pattern for accessing data of a server. Locations, in certain embodiments, comprise independently addressable and/or accessible content and/or assets provided by one or more servers of a service provider 108, or the like, such as webpages, portions of a webpage, images or other data files, databases or other data stores, pages or sections of a mobile application, or the like. The pattern module 308, in one embodiment, determines a pattern/ordered list that contains one or more locations and/or delays that are not necessary for the direct access module 204 to access or use in order to download desired data, but instead, the pattern/ordered list may make it difficult or impossible for the service provider 108 to distinguish between the direct access module 204 accessing a server of the service provider 108 and a user accessing the server of the service provider 108.

The pattern module 308, in one embodiment, may determine and/or select the multiple locations and/or the one or more delays (e.g., a pattern/ordered list) based on an average pattern or a combined pattern identified in or based on behavior of multiple users accessing a service provider 108 using a web browser, a mobile application, or the like. The pattern module 308, in one embodiment, may monitor one or more users (e.g., for a predetermined period of time or the like) as they access a server of a service provider 108, tracking which links, data, webpages, and/or other locations the one or more users access, how long the one or more users access different locations, an order in which the one or more users access locations, or the like. In certain embodiments, the one or more monitored users may be volunteers, who have provided the pattern module 308 with authorization to temporarily or permanently monitor the users' access, in order to provide a more realistic access pattern for the direct access module 204 to use to access a server of a service provider 108.

In a further embodiment, the pattern module 308 determines and/or selects multiple locations and/or one or more delays between accessing different locations based on a pattern identified in behavior of the user associated with the hardware device 102 on which the pattern module 308 is disposed, accessing the third party service using a web browser, a mobile or desktop application, or other interface of the user's hardware device 102. For example, the pattern module 308 may comprise network hardware of the user's hardware device 102 (e.g., a network access card and/or chip, a processor, an FPGA, an ASIC, or the like in communication with the data network 106 to monitor data and/or interactions with a server of a service provider 108), a web browser plugin or extension, a mobile and/or desktop application executing on a processor of the user's hardware device 102, or the like. The pattern module 308 may request and receive authorization from the user to monitor the user's activity with regard to one or more servers of one or more service providers 108 from the user's hardware device 102.

The pattern module 308, in certain embodiments, may update a pattern/ordered list over time, based on detected changes in access patterns of one or more users or the like. In one embodiment, the pattern module 308 may coordinate and/or cooperate with the access repair module 310, described below, to update a pattern/ordered list in response to a server 108 of a service provider 108 and/or data associated with a user becoming broken and/or inaccessible.

In one embodiment, the access repair module 310 detects that access to a server 108 of a service provider 108 and/or data associated with a user is broken and/or becomes inaccessible. The access repair module 310, in certain embodiments, provides an interface to a user allowing the user to graphically identify an input location for the user's electronic credentials, a location of data associated with the user, or the like. For example, the access repair module 310 may provide a GUI, a command line interface (CLI), an API, and/or another interface allowing an end user to identify an input location for electronic credentials, an action for submitting electronic credentials, a location of data, or the like. The access repair module 310, in one embodiment, provides an interface to a user on a hardware device 102 of the user.

In certain embodiments, for example, the access repair module 310 may overlay an interface over one or more pages of a website of a service provider 108 on an electronic display screen of a user's hardware device 102, as described in greater detail below with regard to FIGS. 5A-5B. The access repair module 310 may provide one or more interfaces (e.g., GUIs, CLIs, APIs, overlays, or the like) to multiple users, allowing multiple users to define a repair and/or update for access to a server of a service provider 108 (e.g., in a distributed and/or decentralized manner, from different hardware devices 102 or the like over a network 106).

The access repair module 310, in certain embodiments, may determine and/or display one or more suggestions 504 and/or recommendations 504 for the user, which the user may either confirm or change/correct (e.g., in a basic interface, a standard interface, a beginning user interface, or the like). For example, the access repair module 310 may display one or more interface elements with a suggested location for a user to enter a user name, a suggested location for a user to enter a password, a suggested credential submit action, a suggested location of data associated with the user, and/or one or more other interface elements allowing a user to graphically identify one or more locations within a website of a service provider 108.

The access repair module 310, in certain embodiments, processes one or more pages of and/or other locations on a server 108 (e.g., one or more websites, web apps, or the like) to determine an estimate and/or prediction of an input location for a user's electronic credentials, an action for submitting a user's electronic credentials, a location of data associated with a user, or the like. In one embodiment, the access repair module 310 may estimate one or more locations and/or actions (e.g., by scanning and/or parsing one or more pages of a website, based on input from other users accessing one or more pages of a website, based on previous interactions of the user with one or more pages of a website, a prediction made using a machine learning and/or artificial intelligence analysis of a website, based on a statistical analysis of historical changes to one or more pages of a website and/or of one or more similar websites, or the like). The access repair module 310 may display to a user in an interface an estimate and/or prediction of an input location for the user's electronic credentials, a location of data associated with the user, or the like so that the user may confirm whether or not the estimate and/or prediction is correct using the interface.

The access repair module 310 may indicate one or more estimated locations and/or actions with an arrow or other pointer to a location; a link or other identifier of a location; a box or other highlighting around a location; by altering text labeling for a location to make the text bold, italic, and/or underlined; or the like. A user, in certain embodiments, may click, select, or otherwise identify a location to either confirm or change/correct a location suggested by the access repair module 310. For example, a user may click or otherwise select an interface element associated with a location and/or action and may click or otherwise select the location and/or perform the action, which the access repair module 310 may record (e.g., automatically populating a text field identifying the location and/or action, recording a macro allowing the action to be automatically repeated without the user, for a different user, or the like).

In certain embodiments, instead of or in addition to a standard, basic, or beginning user interface, the access repair module 310 may provide an advanced interface, for experienced users or the like, with source code of a website and/or other details of the website. For example, in one embodiment, an advanced access repair interface may allow one or more advanced users to identify one or more locations and/or actions within source code of a website, which may not be visible and/or readily apparent in the website itself. In certain embodiments, the access repair module 310 may provide a user interface element allowing a user to select and/or toggle between a standard user interface or view and an advanced user interface or view.

In one embodiment, the test module 318 cooperates with the access repair module 310 to verify whether or not one or more received locations and/or instructions from a user are accurate (e.g., usable to access data from a server of a service provider 108). The test module 318, in certain embodiments, attempts to access a server 108 of a service provider 108 for a plurality of different users (e.g., a sample group or test set), based on an identification the access repair module 310 received from a single user, using electronic credentials of the different users or the like.

The test module 318, in certain embodiments, determines whether data associated with the different users (e.g., a sample group or test set) is accessible using the identification from the single user. The test module 318 may repeatedly attempt to access data from a service provider 108 using identifications which the access repair module 310 received from different users (e.g., on different hardware devices 102 and sent to the test module 318 on a single hardware device 102 over the data network 106, sent to multiple test modules 318 on different hardware devices 102 over the data network 106, sent to a test module 318 on a central backend server 110, or the like).

The test module 318, in one embodiment, provides one or more identifications from a user to other instances of the direct access module 204 (e.g., other test modules 318) for accessing a server 108 of a service provider 108 in response to an amount of the different users (e.g., a sample group or test set) for which data is accessible using the identification from the single user satisfying a threshold. For example, if the identification from the single user successfully allows a predefined number of other test users (e.g., 2 users, 10 users, 100 users, 1000 users, 50% of test users, 75% of test users, and/or another predefined threshold number of test users) to access their data from a service provider 108, the test module 318 may provide instructions based on the identification to more users (e.g., all or substantially all users, or the like).

In certain embodiments, the test module 318 may successively increase a test size comprising a number of users to which the test module 318 provides instructions for accessing their data from a service provider 108 using an identification from a single user (e.g., starting with one or more test users, increasing to two or more, three or more, four or more, five or more, ten or more, twenty or more, thirty or more, forty or more, fifty or more, one hundred or more, five hundred or more, one thousand or more, five thousand or more, ten thousand or more, one hundred thousand or more, a million or more, and/or other successively increasing numbers of test users). The test module 318, in one embodiment, includes instructions based on an identification from a single user in an ordered list of multiple different sets of instructions for accessing a server 108 of a service provider 108, as described in greater detail below with regard to the hierarchy module 312.

The test module 318, in certain embodiments, is configured to prioritize identifications from one or more users based on one or more trust factors for the one or more users (e.g., scores or the like). A trust factor, in one embodiment, may comprise a score or other metadata indicating a likelihood that a user's identification is correct. For example, in various embodiments, a trust factor may include and/or be based on one or more of a history of a user's previous identifications (e.g., correct or incorrect), a user's affiliation with a provider (e.g., a creator, a vendor, an owner, a seller, a reseller, a manufacturer, the backend server 110, or the like) of the one or more discovery modules 104, positive and/or negative indicators (e.g., votes, likes, uses, feedback, stars, endorsements, or the like) from other users, and/or other indicators of whether or not a user's identification is likely to be correct. The test module 318 may determine how many other users to provide a user's identification based on one or more trust factors associated with the user (e.g., accelerating a rate at which a user's identification is provided to other users in response to a higher trust factor, decreasing a rate at which a user's identification is provided to other users in response to a lower trust factor, or the like).

The test module 318 may provide an override interface, allowing an administrator, moderator user, or the like to remove an identification, adjust and/or override an identification, adjust and/or override a trust factor for a user, ban a user from providing identifications, and/or otherwise override a user or a user's identification. In various embodiments, the test module 318 may provide an override interface to an administrator and/or moderator as a GUI, an API, a CLI, or the like.

In certain embodiments, the test module 318 causes the one or more discovery modules 104 and their aggregation services to be self healing, self testing, and/or self incrementally deploying, as it tests and uses the most effective solutions, or the like (e.g., sets of instructions based on indications from one or more users).

In one embodiment, the hierarchy module 312 provides the direct access module 204 with an ordered list of multiple different sets of instructions for accessing a server 108 of a service provider 108 using a user's electronic credentials, for downloading data associated with the user, or the like. Each different set of instructions, in certain embodiments, comprises a location for entering a user's electronic credentials, an instruction for submitting the user's electronic credentials, one or more locations of the data associated with the user, or the like.

The hierarchy module 312, in one embodiment, may receive one or more sets of instructions from a backend server 110 (e.g., a backend discovery module 104b of a backend server 110), from another user hardware device 102 in a peer-to-peer manner (e.g., a discovery module 104a of a user hardware device 102), from a test module 318, or the like. The hierarchy module 312, in certain embodiments, may receive multiple different sets of instructions already in an ordered list (e.g., a global hierarchical order) based on a history of successful and/or unsuccessful uses of the different sets of instructions by different user hardware devices 102 and/or users, or the like. In one embodiment, the hierarchy module 312 may determine a hierarchy for and/or create an ordered list from multiple different sets of instructions for a single user (e.g., a custom or individualized hierarchy) based on a history of successful and/or unsuccessful uses of the different sets of instructions by the user (e.g., from one or more hardware devices 102 of the user).

The direct access module 204, in one embodiment, may iterate through an ordered list of multiple sets of instructions for accessing a server 108 of a service provider 108, in the order of the list, until one of the sets of instructions is successful and the direct access module 204 is able to access and/or download data from the service provider 108. The hierarchy module 312, in one embodiment, may place a most recent successfully used set of instructions at the top (e.g., as the first set to try). For example, the hierarchy module 312 for a user's hardware device 102 may place a set of instructions for accessing a service provider 108 at the top of a list (e.g., adjusting an order of the list over time) in response to the direct access module 204 successfully accessing and/or downloading data from the service provider 108 using the set of instructions. In certain embodiments, the hierarchy module 312 may receive an ordered list of multiple different sets of instructions for accessing a server 108 of a service provider 108 in a first order (e.g., a global order) and may dynamically adjust and/or rearrange the different sets of instructions over time based on a single user's/hardware device 102's use (e.g., moving a set of instructions up in the list if access using the set of instructions is successful for the user/hardware device 102, moving a set of instructions down in the list if access using the set of instructions is unsuccessful for the user/hardware device 102, or the like).

The hierarchy module 312, in certain embodiments, may be configured to share one or more sets of instructions, an ordered list of multiple sets of instructions, or the like with a hierarchy module 312 of another user's hardware device 102 over a data network 106 (e.g., directly to the other user's hardware device 102 in a peer-to-peer manner, indirectly by way of a backend discovery module 104b of a backend server 110, or the like). Different sets of instructions may be successful or unsuccessful for different users, in various embodiments, due to different account types, different account settings, different originating systems (e.g., due to a corporate acquisition or the like, different users of the same service provider 108 may have one or more different settings, different access methods, or the like), system changes or upgrades, and/or another difference in accounts, services, or the like for different users of the same service provider 108.

In one embodiment, the route module 314 determines whether a hardware device 102 of a user is available for the direct access module 204 to download data associated with the user from a server 108 of a service provider 108. The route module 314, in certain embodiments, may access a server 108 of a service provider 108, from a remote backend server 110, using the user's electronic credentials, to download data associated with the user from the server 108 to the remote backend server 110 in response to the route module 314 determining that the hardware device 102 of the user is unavailable. The route module 314, in one embodiment, provides a user one or more alerts (e.g., downloaded data from a service provider 108, a recommendation or suggestion determined based on data from a service provider 108, a notification or other alert based on an event or other trigger detected in data from a service provider 108, or the like) on a hardware device 102 of the user based on the data associated with the user downloaded to the remote backend server 110.

In certain embodiments, the route module 314 maintains and/or stores a list of multiple hardware devices 102 associated with a single user and/or account. In response to determining that one hardware device 102 associated with a user and/or account is unavailable (e.g., powered down, in airplane mode, not connected to the data network 106, or the like), the route module 314 may access a server 108 of a service provider 108 from a different, available hardware device 102 of the user and/or account, may provide one or more notifications or other alerts on a different, available hardware device 102, or the like. The route module 314, in various embodiments as described below with regard to FIGS. 4A-4C, may dynamically route downloading of data for a user from a service provider 108 between multiple hardware devices, such as one or more hardware devices 102 of the user, one or more hardware devices 102 of a different user, one or more backend servers 110, and/or another hardware device, in a secure manner.

The route module 314, in one embodiment, may alternate or rotate between multiple hardware devices 102, 110 (e.g., of the same user, of different users, or the like) for downloading data for the same user from a service provider 108 periodically. For example, rotating and/or alternating devices 102, 110 from which data is downloaded, may decrease a likelihood that the downloading will be misinterpreted as fraudulent or improper. In another embodiment, the route module 314 may download data from the same device 102, 110 (e.g., a primary hardware device 102 of a user, a backend server 110, or the like), which may be authorized and/or identified by the service provider 108 as a trusted device, or the like.

In one embodiment, the frequency module 316 sets a frequency with which the direct access module 204 accesses the server 108 of a service provider 108. The frequency module 316, in certain embodiments, determines a frequency based on input from a remote backend server 110, which may be unaffiliated with the service provider 108 being accessed, so that the remote backend server 110 (e.g., the frequency module 316 executing on the remote backend server 110) determines frequencies for a plurality of direct access modules 204 for different users and/or different hardware devices 102. For example, the frequency module 316 may limit a single user and/or hardware device 102 from accessing the same service provider 108 more than an allowed threshold number of times within a time period (e.g., once every ten minutes, once every half an hour, once every hour, twice a day, three times a day, four times a day, or the like). The frequency module 316, in certain embodiments, limits an access frequency to prevent inadvertent denial of service by a service provider 108, or the like.

The frequency module 316, in certain embodiments, may dynamically adjust a frequency with which a user and/or hardware device 102 may access a service provider 108 over time. For example, the frequency module 316 may monitor access and/or downloads by multiple users (e.g., all users, available users, active users, or the like) to cap or limit a total access and/or download bandwidth for each of the different service providers 108 (e.g., so as not to overwhelm any single service provider 108, or the like). In this manner, in one embodiment, a user and/or hardware device 102 may access and/or download data with a higher frequency when fewer other users and/or hardware devices 102 are accessing and/or downloading data (e.g., low peak times), but may be limited to a lower cap or access frequency when more other users and/or hardware devices 102 are accessing and/or downloading data (e.g., high peak times).

In a further embodiment, the frequency module 316 determines a frequency based on input from a user, allowing the user to set the access frequency independently of other users and/or of a backend server 110. The frequency module 316 may provide a user interface (e.g., a GUI, CLI, API, or the like) allowing a user to set and/or adjust an access frequency for downloading data from one or more service providers 108 using one or more hardware devices 102 (e.g., providing different settings allowing the user to set different access frequencies for different service providers 108, different hardware devices 102 of the user, or the like).

Figure 4A:
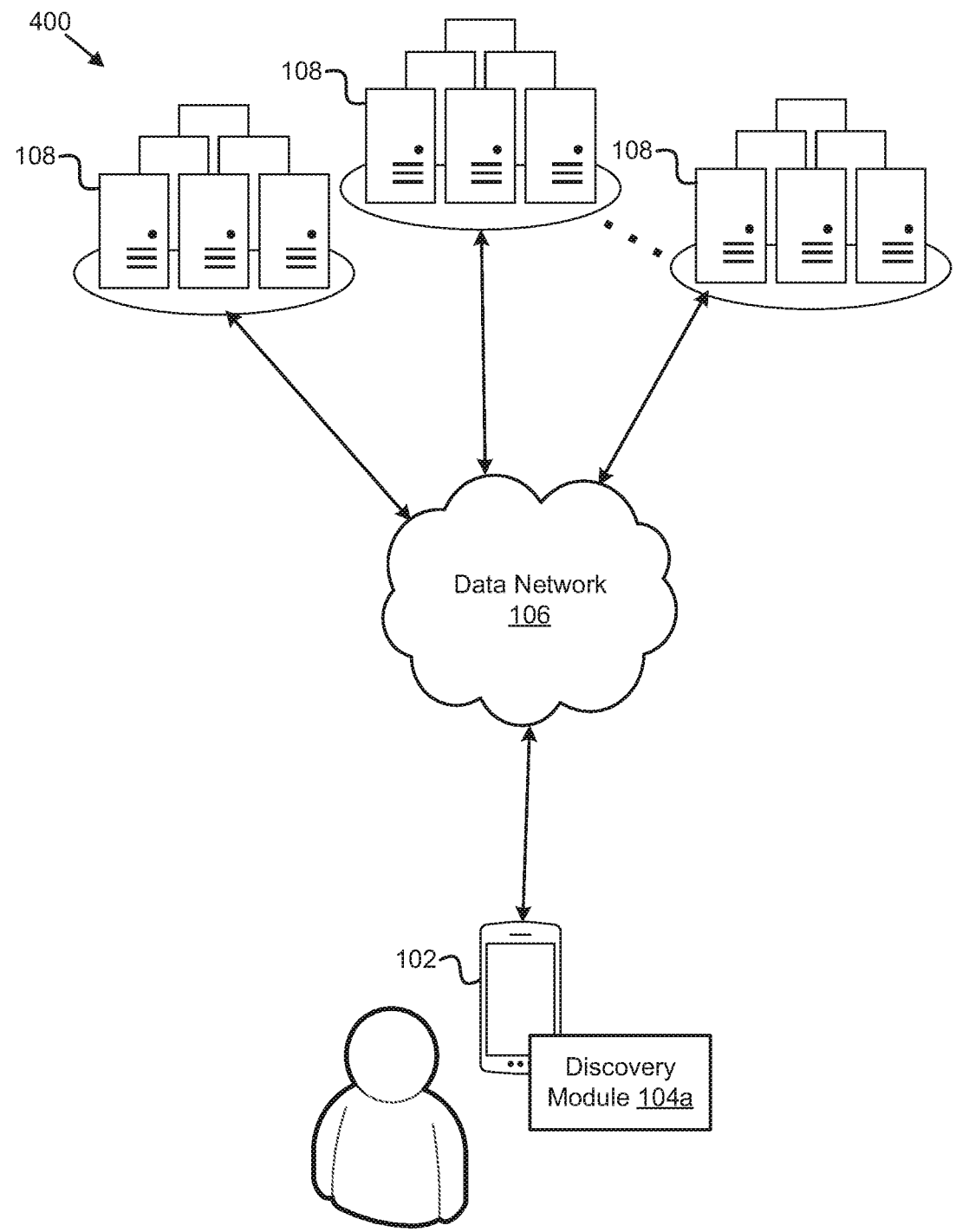
FIG. 4A is a schematic block diagram illustrating an additional embodiment of a system for externally held account discovery and aggregation.

FIG. 4A depicts one embodiment of a system 400 for externally held account discovery. The system 400, in the depicted embodiment, includes a single user hardware device 102 with a discovery module 104a. An authentication module 202 of the discovery module 104a, in certain embodiments, may store and/or manage electronic user credentials locally on the user's hardware device 102, the direct access module 204 may access one or more service providers 108 directly from the user's hardware device 102 (e.g., over the data network 106) to download data associated with the user to the user's hardware device 102, the interface module 206 may provide the data and/or one or more alerts/messages based on the data to the user from the user's hardware device 102, or the like. In the depicted system 400, the discovery module 104a may create a local repository of data for the user from one or more service providers 108, on the user's hardware device 102, without providing the user's credentials, the user's data, or the like to a different user's hardware device, to a backend server 110, or the like.

Figure 4B:
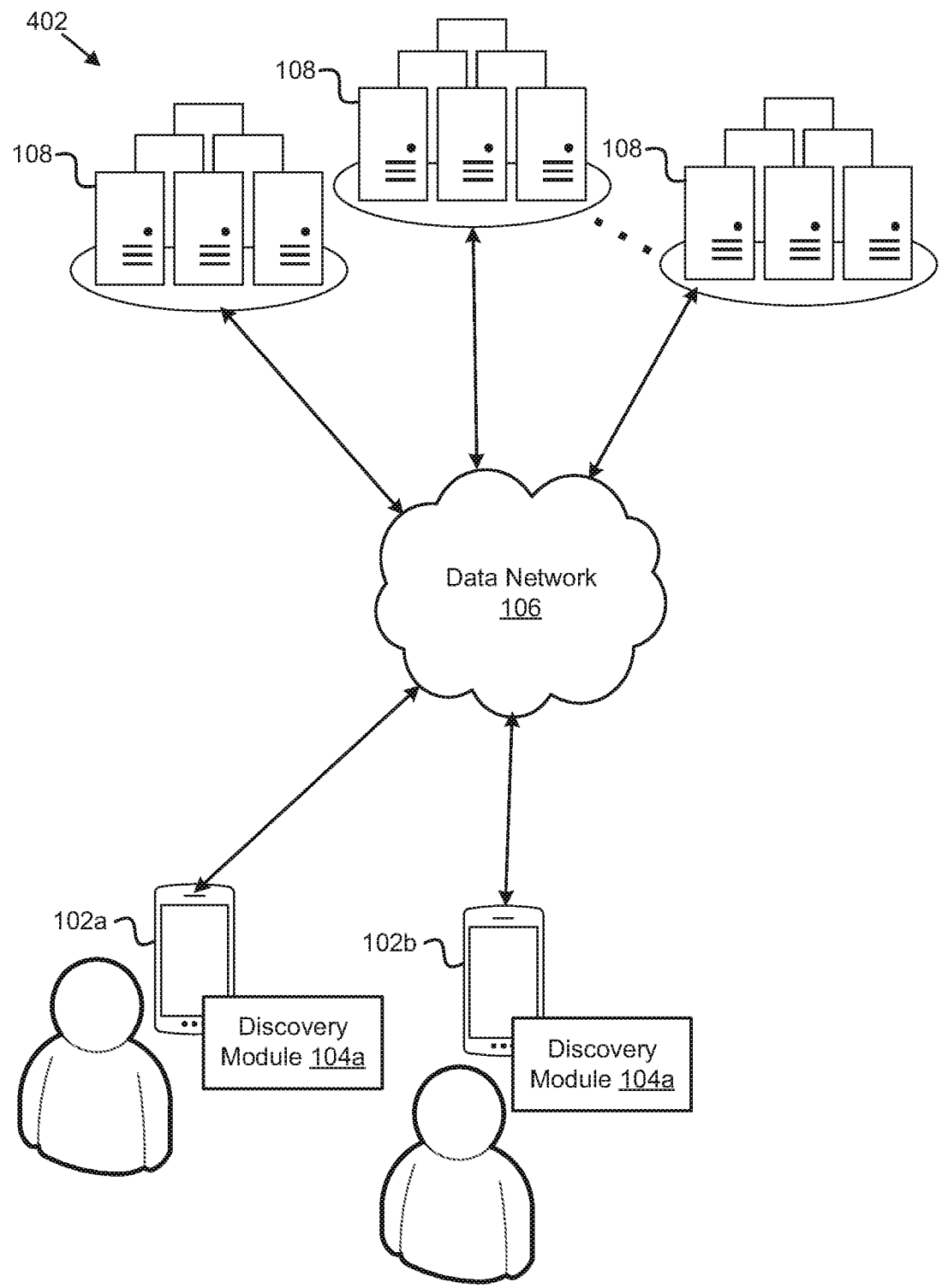
FIG. 4B is a schematic block diagram illustrating a further embodiment of a system for externally held account discovery and aggregation.

FIG. 4B depicts one embodiment of a system 402 for externally held account discovery. The system 402, in the depicted embodiment, includes a plurality of user hardware devices 102 with discovery modules 104a, associated with different users. In certain embodiments, a first discovery module 104a (e.g., an authentication module 202 of the first discovery module 104a) may securely provide encrypted user credentials for a first user from the first user's hardware device 102a to a second discovery module 104a (e.g., an authentication module 202 of the second discovery module 104a), over the data network 106 or the like, so that a direct access module 204 of the second discovery module 104a may access one or more service providers 108 from the second user's hardware device 102b (e.g., over the data network 106) to download data associated with the first user.

For example, the second user's hardware device 102b may download data for the first user in response to the first user's hardware device 102a being powered off, being asleep, being blocked from accessing one or more service providers 108, or the like, as determined by a route module 314, or the like. The interface module 206 of the second discovery module 104a may provide one or more alerts/messages to the first user based on the downloaded data and/or may provide the downloaded data to the first user (e.g., in response to the first user's hardware device 102a becoming available, to a different hardware device 102 associated with the first user, to a backend server 110 to which the first user has access, or the like). As described above, in certain embodiments, the authentication module 202, the direct access module 204, the interface module 206, and/or the route module 314 may encrypt and/or otherwise secure data for the first user (e.g., the first user's electronic credentials, downloaded data associated with the first user, alerts/messages for the first user), so that it is difficult or impossible for the second user to access the data for the first user, thereby preventing and/or minimizing unauthorized access to the first user's data while providing greater flexibility in devices 102 and/or locations from which data for the first user may be downloaded.

Figure 4C:
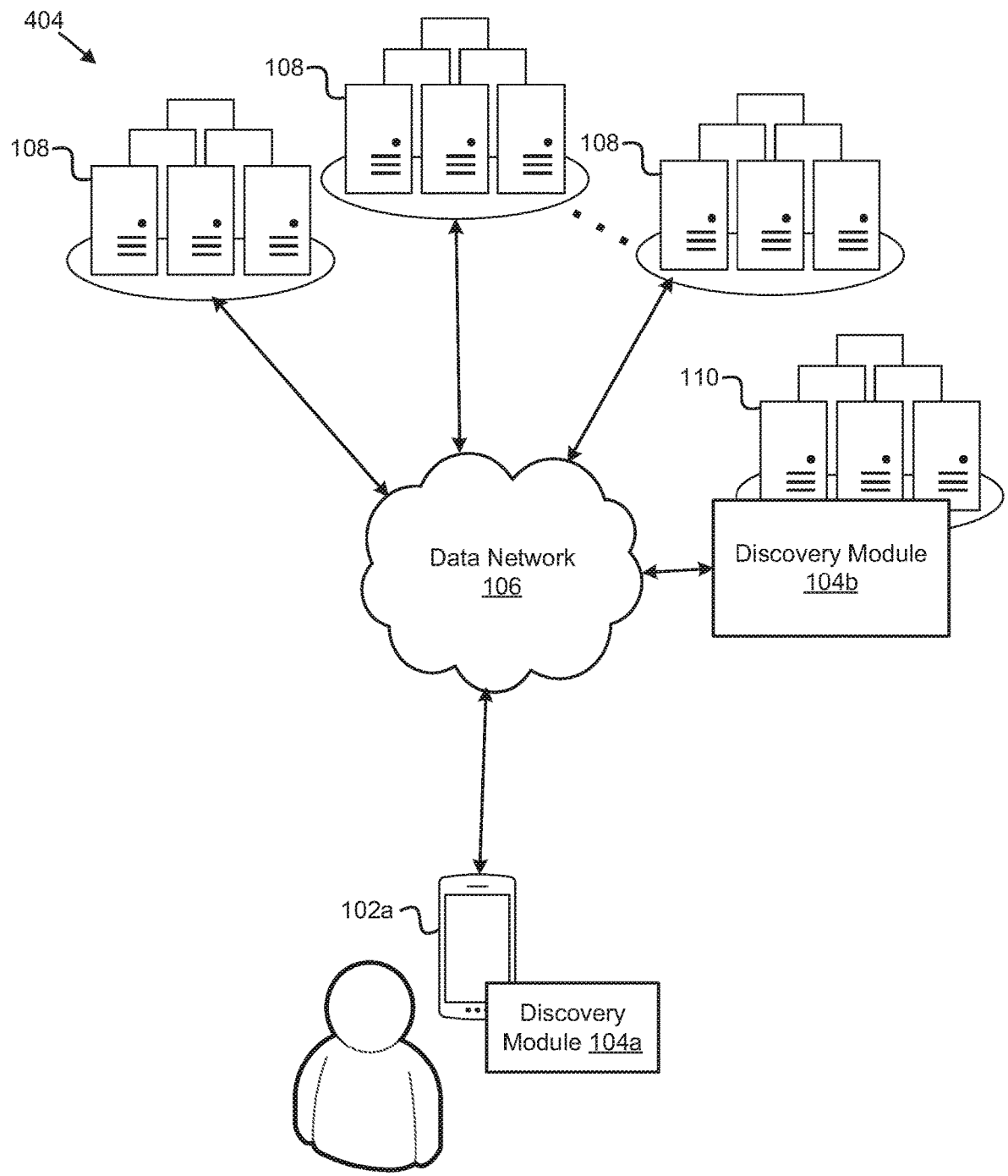
FIG. 4C is a schematic block diagram illustrating a certain embodiment of a system for externally held account discovery and aggregation.

FIG. 4C depicts one embodiment of a system 404 for externally held account discovery. The system 404, in the depicted embodiment, includes one or more user hardware devices 102 with one or more discovery modules 104a, and one or more backend servers 110 comprising one or more backend discovery modules 104b. An authentication module 202 of a discovery module 104a, in certain embodiments, may securely provide encrypted user credentials for a user from the user's hardware device 102 to a backend discovery module 104b (e.g., an authentication module 202 of the backend discovery module 104b) on a backend server 110, over the data network 106 or the like, so that a direct access module 204 of the backend discovery module 104b may access one or more service providers 108 from the backend server 110 (e.g., over the data network 106) to download data associated with the user.

For example, the backend server 110 may download data for the user in response to the user's hardware device 102a being powered off, being asleep, being blocked from accessing one or more service providers 108, or the like, as determined by a route module 314, or the like. The interface module 206 of the backend discovery module 104b may provide one or more alerts/messages to the user based on the downloaded data and/or may provide the downloaded data to the user (e.g., in response to the user's hardware device 102a becoming available, to a different hardware device 102 associated with the first user, directly from the backend server 110 as a web page and/or through a dedicated application, or the like).

Figure 5:
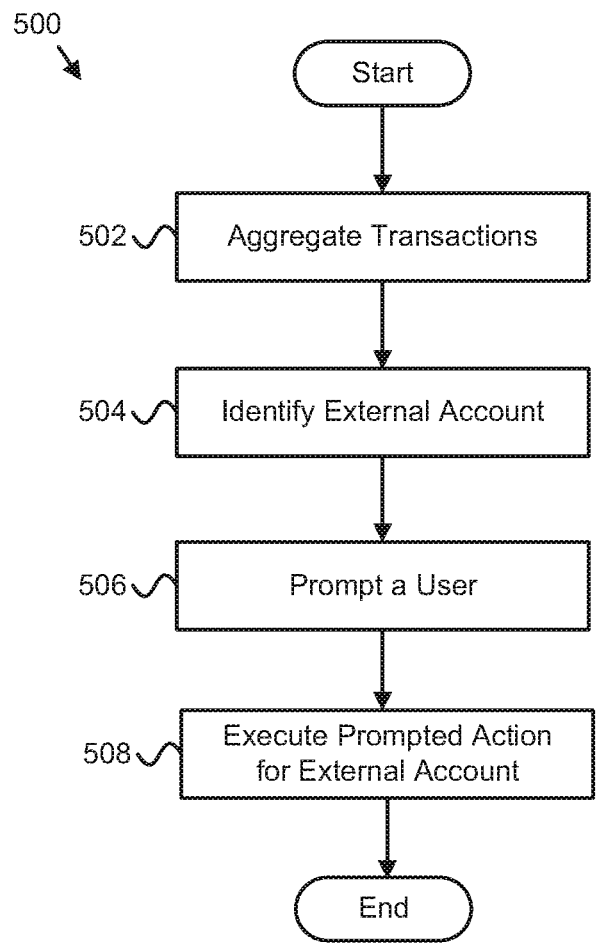
FIG. 5 is a schematic flow chart diagram illustrating one embodiment of a method for externally held account discovery and aggregation.

FIG. 5 depicts one embodiment of a method 500 for externally held account discovery and aggregation. The method 500 begins and a direct access module 204 aggregates 502 transactions of a first service provider 108 from one or more servers 108 to a trusted hardware device 102 and/or 110. An external account module 208 identifies 504, on the trusted hardware device 102 and/or 110, one or more of the aggregated 502 transactions between an account of a user with the first service provider 108 and a different, third party service provider 108, indicating an externally held account of the user with the different, third party service provider 108. An external account module 208 prompts 506 a user for authorization to perform an action with regard to the different, third party service provider 108 (e.g., for electronic credentials for the different, third party service provider 108; for authorization to migrate an externally held account of the user from the different, third party service provider 108; for authorization to aggregate the user's transaction data from the different, third party service provider 108; or the like). An external account module 208 executes 508 the prompted 506 action for the identified 504 externally held account (e.g., using the electronic credentials for the different, third party service provider 108 to migrate an externally held account of the user from the different, third party service provider 108, to aggregate the user's transaction data from the different, third party service provider 108, or the like) and the method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
aggregating, by a trusted hardware device comprising a secure element, transactions of a first service provider from one or more servers using one or more electronic credentials of a user;
identifying, on the trusted hardware device, one or more of the aggregated transactions between a first account of the user with the first service provider and a second account of the user with a second service provider, wherein the trusted hardware device has not yet received electronic credential for the second account;
determining that the one or more aggregated transactions comprises a recurring transaction associated with the second account based on a detected payment pattern;
prompting the user, in response to determining the recurring transaction, for electronic credentials for the second account with the second service provider;
in response to receiving the electronic credentials for the second account, accessing data associated with the second account from the second service provider on behalf of the user using the electronic credentials; and
displaying, on the trusted hardware device, the aggregated transactions of the first and second service providers within a single graphical user interface.

2. The method of claim 1, wherein accessing data of the user from the second service provider comprises aggregating transactions of the second service provider to the trusted hardware device in response to the user accepting the prompting.

3. The method of claim 2, further comprising electronically displaying to the user, within a single graphical user interface, the aggregated transactions of the first service provider and the aggregated transactions of the second service provider.

4. The method of claim 1, wherein accessing data of the user from the second service provider comprises migrating the account of the user with the second service provider to the first service provider in response to the user accepting the prompting.

5. The method of claim 4, further comprising aggregating subsequent transactions of the first service provider from the one or more servers and verifying whether the account of the user with the second service provider was successfully migrated to the first service provider.

6. The method of claim 4, wherein migrating the account of the user with the second service provider to the first service provider comprises replacing the account of the user with the second service provider with a new account for the user with the first service provider.

7. The method of claim 4, wherein migrating the account of the user with the second service provider to the first service provider comprises transferring the accessed data of the user from the second service provider to the first service provider for the user.

8. The method of claim 1, wherein the one or more transactions comprise one or more payments from the first account to the second account, the first account comprises a deposit account with the first service provider, and the second account comprises a loan from the second service provider.

9. The method of claim 1, further comprising determining whether to prompt the user for the electronic credentials based on the aggregated transactions.

10. The method of claim 9, further comprising re-prompting the user to migrate additional subsequent instances of the repeating event to the different service provider in response to verifying that one or more of the subsequent instances of the repeating event has not remained migrated to the different service provider.

11. The method of claim 1, wherein the secure element comprises a secure cryptoprocessor, a secure storage device, a trusted platform module (TPM), a secure boot ROM, an authentication chip, or a combination thereof.

12. An apparatus comprising:
a trusted hardware device comprising a secure element and authorized by a user to use a plurality of electronic credentials for the user, the trusted hardware device configured to:
aggregate transactions of a first service provider from one or more servers using one or more of the electronic credentials for the user;
identify one or more of the aggregated transactions associated with both the first service provider and with a second service provider for which the trusted hardware device has not yet received electronic credentials for the user;
determine that the one or more aggregated transactions comprises a recurring transaction associated with the second account based on a detected payment pattern;
prompt the user, in response to determining the recurring transaction, for the electronic credentials for the user for the second service provider;
in response to receiving the electronic credential for the second service provider, aggregate transactions of the second service provider, using the electronic credentials for the user for the second service provider; and
display the aggregated transactions of the first and second service providers within a single graphical user interface.

13. The apparatus of claim 12, wherein the trusted hardware device is further configured to electronically display to the user, within a single graphical user interface, the aggregated transactions of the first service provider and the aggregated transactions of the second service provider.

14. The apparatus of claim 12, wherein the trusted hardware device is further configured to migrate an account of the user with the second service provider to the first service provider in response to the user accepting the prompting.

15. The apparatus of claim 12, wherein the identified one or more of the aggregated transactions comprise one or more payments from a first account of the user with the first service provider to a second account of the user with the second service provider.

16. The apparatus of claim 15, wherein the first account comprises a deposit account with the first service provider and the second account comprises a loan from the second service provider.

17. A system comprising:
a backend server, comprising a secure element, that identifies one or more externally held accounts for at least a subset of a plurality of users based on aggregated transaction data for each of the plurality of users from a service provider associated with the backend server, the one or more externally held accounts held for the subset of users by a third party service provider; and
a plurality of external account modules located on hardware devices for the plurality of users, the external account modules configured to:
prompt at least the subset of users for electronic credentials for the third party service provider;
aggregate transaction data for one or more of the users from the third party service provider using the electronic credentials;
determine that the aggregated transaction data comprises a recurring transaction associated with a second third party service provider based on a detected payment pattern based on a detected payment pattern;
prompt at least a subset of the plurality of users, in response to determining the recurring transaction, for electronic credentials for the second third party service provider;
in response to receiving the electronic credentials for the second third party service provider, access data associated with the second third party service provider on behalf of the at least a subset of users using the electronic credentials; and
display the aggregated transaction data of the third party service provider and the second service provider within a single graphical user interface.

18. The system of claim 17, wherein the plurality of external account modules are configured to electronically display, on the hardware devices for the plurality of users, the aggregated transaction data from the service provider, and the aggregated transaction data from the third party service provider.

19. The system of claim 17, wherein the plurality of external account modules are configured to migrate accounts for at least the subset of users from the third party service provider to the service provider using the electronic credentials.

20. The system of claim 17, wherein the identified one or more externally held accounts comprise loans from the third party service provider and the aggregated transaction data from the service provider comprises payments from deposit accounts with the service provider to the loans from the third party service provider.

* * * * *